(12) United States Patent
Nakatani et al.

(10) Patent No.: US 6,411,582 B1
(45) Date of Patent: Jun. 25, 2002

(54) DISK PLAYER

(75) Inventors: Mitsuo Nakatani; Masakazu Kawabata, both of Tokyo (JP)

(73) Assignee: Clarion Co., Ltd., Saitame-ken (JP)

( * ) Notice: Subject to any disclaimer, the term of this patent is extended or adjusted under 35 U.S.C. 154(b) by 0 days.

(21) Appl. No.: 09/216,603

(22) Filed: Dec. 17, 1998

(30) Foreign Application Priority Data

Dec. 26, 1997 (JP) .............................................. 9-360842

(51) Int. Cl.[7] .............................................. G11B 17/04
(52) U.S. Cl. ..................................... 369/75.2; 369/77.1
(58) Field of Search .......................... 369/75.1, 75.2, 369/77.1, 77.2, 178, 179, 191, 215, 219, 244, 249

(56) References Cited

U.S. PATENT DOCUMENTS

| | | | | |
|---|---|---|---|---|
| 4,701,901 A | * | 10/1987 | Imai ........................... | 369/75.2 |
| 4,797,866 A | | 1/1989 | Yoshikawa | |
| 5,251,195 A | * | 10/1993 | Kawakami et al. ......... | 369/75.2 |
| 5,313,351 A | | 5/1994 | Lee | |
| 5,500,844 A | * | 3/1996 | Kim et al. .................. | 369/77.2 |
| 5,633,850 A | * | 5/1997 | Park ........................... | 369/77.1 |
| 5,636,198 A | | 6/1997 | Maeng | |
| 5,691,969 A | * | 11/1997 | Fujisawa .................... | 369/77.1 |
| 5,742,571 A | * | 4/1998 | Hoshino et al. ............ | 369/75.2 |
| 5,793,730 A | * | 8/1998 | Ootsuka ..................... | 369/77.1 |
| 5,812,510 A | * | 9/1998 | Son ............................ | 369/75.2 |
| 6,044,054 A | * | 3/2000 | Shiomi ....................... | 369/77.1 |

FOREIGN PATENT DOCUMENTS

| | | | |
|---|---|---|---|
| JP | 61 177687 A | | 12/1986 |
| JP | 62-183081 | * | 8/1987 |
| JP | 62-271245 | * | 11/1987 |
| JP | 01-134749 | * | 5/1989 |
| JP | 01-227284 | * | 9/1989 |
| JP | 03-147562 | * | 6/1991 |

* cited by examiner

Primary Examiner—David L. Ometz
(74) Attorney, Agent, or Firm—Price and Gess

(57) ABSTRACT

A disk player includes a selecting mechanism, a switching control mechanism a transporting roller-actuating mechanism, and a pickup feeding mechanism. In the disk player, an idler plate pivots in response to a direction of rotation of a worm wheel that always meshes with a worm provided on a shaft of a loading motor. Three idler gears that always mesh with the worm wheel are provided on the idler plate. The idler plate couples a switching idler gear to the switching control mechanism at a disk mounting position, couples a transporting roller-actuating idler gear to the transporting roller-actuating mechanism, and couples a pickup feeding idler gear to the pickup feeding mechanism at a pickup feed position.

11 Claims, 14 Drawing Sheets

DISK PLAYER

BACKGROUND OF THE INVENTION

1. Field of the Invention

The present invention relates to a disk player, and more particularly, to a disk player which can achieve simplification of a configuration for actuating a pickup feeding mechanism for moving an optical pickup that reads optical disk signals in a radial direction of a disk, and simplification of a configuration for detecting a state of the overall mechanism in the disk player.

2. Description of the Related Art

Disk players, such as CD players, of the type for reading optical disk signals basically include three mechanisms: a disk rotating mechanism for rotationally driving a turntable, thereby rotating a disk carried by the turntable, a disk mounting mechanism for mounting the disk onto the turntable of a disk drive section, and a pickup feeding mechanism for moving the optical pickup in a radial direction of the disk.

Hitherto, these three mechanisms have been individually actuated by three motors that are separately provided thereon. That is, since an immediate response and a high-speed rotation are essential, the disk rotating mechanism is directly actuated by a disk rotating mechanism motor that is direct-coupled to the turntable.

Because of sequential operation of the disk in the horizontal and vertical directions with respect to the surface of the turntable, the disk mounting mechanism generally includes a transporting roller for horizontally transporting the disk onto the turntable, a clamper member for chucking the disk on the turntable, and a shift plate for switching the transporting roller and the damper member. The shift plate is linearly actuated by a disk mounting mechanism motor so as to switch the transporting roller and the clamper member, and to rotate the transporting roller.

Since a high degree of accuracy is essential, the pickup feeding mechanism is configured so that the optical pickup is precisely linearly moved by a lead screw that is directly engaged with the optical pickup, and the lead screw is adapted to be rotationally actuated by a pickup feeding mechanism motor that is arranged in the vicinity thereof.

On the other hand, in order to smoothly perform switching of actuation of the mechanisms and switching of modes between a control circuit and a signal processing circuit with a proper timing,, a plurality of detection elements, such as detection sensors and detection switches, are used in the disk player. More specifically, there are provided a disc detection element for detecting insertion of the disk, a chucking completion detection element for detecting the completion of chucking of the disk mounting mechanism, and an inner periphery detection element for detecting the optical pickup located at an inner peripheral position. In addition, signals from these detection elements are used as starting/stopping commands for switching the actuation of the mechanisms.

For example, the signal obtained by the disk detection element is used as a start command for the disk mounting mechanism motor when inserting the disk, and a stop command for the disk mounting mechanism motor during a disk ejecting operation. The signal obtained by the chucking completion detection element is used as a start command for the pickup feeding mechanism motor during a shift from a disk loading operation to a disk playback operation, and a stop command for the disk mounting mechanism motor. The signal obtained by the inner periphery detection element is used as a start signal for the disk rotating mechanism motor at the start of the disk playback operation, a stop signal for the disk rotating mechanism motor, and a start command for the disk mounting mechanism motor during a shift from the disk playback operation to the disk ejecting operation.

The inner peripheral position to be detected by the inner periphery detection element is the position where TOC (Table of Contents) information, which is administrative information recorded in the inner peripheral area (read-in area) of an information recording area in the disk, is readable. That is, in the disk playback operation performed by the optical pickup, the TOC information is first read at the inner peripheral position and then, the disk playback operation is started on the basis of the TOC information. The inner periphery detection element is provided to detect the optical pickup located at such an inner peripheral position.

In the above conventional disk player, a large number of motors and detection elements are included, thereby complicating the configuration thereof.

That is, as described above, three motors are required for the configuration such that motors are individually used for the disk rotating mechanism, the disk mounting mechanism, and the pickup feeding mechanism. The use of the three motors increases the number of components including motor supporting members and driving force-transmitting members to complicate the configuration, and moreover, occupies a large space to restrict an arrangement and a design of peripheral members, thereby causing the overall mechanism to be increased in size and complicated. In addition, the number of wires is also increased because of individual power supply and control of the three motors. Furthermore, with respect to cost, the motors occupy a considerably large proportion of the entire mechanism, so that the use of the three motors is an obstacle in achieving cost reduction.

On the other hand, since the three mechanisms are actuated by individual motors, at least three detection elements of the disk detection element, the chucking completion detection element and the inner periphery detection element are required for switching the actuation of the mechanisms. The use of the three detection elements increases the number of wires for the detection elements. In addition, although the detection elements occupy a small space in the mechanism as compared with the motors, the increased number thereof restricts an arrangement and a design of peripheral members, thereby causing the overall mechanism to be complicated.

SUMMARY OF THE INVENTION

Accordingly, it is an object of the present invention to provide a disk player which can achieve an increase in the versatility of the arrangement and design of the members, a reduction in size and simplification of the overall mechanism, and a reduction in cost by reducing the number of motors, detection elements, and associated members including wires.

In accordance with an aspect of the present invention, there is provided a disk player, including a disk rotating mechanism for rotationally driving a turntable, thereby rotating a disk carried by the turntable, a disk mounting mechanism for mounting the disk onto the turntable of a disk drive section, and a pickup feeding mechanism for moving an optical pickup reading optical signals in a radial direction of the disk, wherein the disk player includes a selecting mechanism for transmitting a driving force from a single driving source selectively to the disk mounting mechanism and the pickup feeding mechanism.

In the disk player in accordance with the present invention, the selecting mechanism may preferably have a selecting member which moves between a disk mounting position to transmit the driving force to the disk mounting mechanism and a pickup feed position to transmit the driving force to the pickup feeding mechanism. The disk mounting mechanism may preferably have a disk mounting lock means which locks the selecting member to the disk mounting position during a disk mounting operation. In addition, the pickup feeding mechanism may preferably have a pickup feeding lock means which locks the selecting member at the pickup feed position during a pickup feeding operation.

In accordance with the described arrangements, the selecting member is locked at the disk mounting position by the disk mounting lock means during the disk loading and ejecting operations, whereby the disk mounting mechanism can be reliably kept coupled to the driving side. In addition, the selecting member is locked at the pickup feed position by the pickup feeding lock means during the disk playback operation and the return operation of the optical pickup, whereby the pickup feeding mechanism can be reliably kept coupled to the driving side.

In the disk player in accordance with the present invention, the disk mounting lock means may preferably be provided on a part of an operating member constituting the disk mounting mechanism, and adapted to release the lock of the selecting member when the operating member reaches an operating completion position.

In accordance with the described arrangement, the selecting member is locked at the disk mounting position by the operating member constituting the disk mounting mechanism during the disk loading and ejecting operations, whereby the disk mounting mechanism can be reliably kept coupled to the driving side. In addition, the lock of the selecting member is released upon completion of the operation of the operating member, whereby the disk mounting mechanism can be separated from the driving side, and the selecting member can be moved to the pickup feed position.

In the disk player in accordance with the present invention, the disk mounting lock means may preferably be provided on a part of a switching member for switching the chucking of the disk on the turntable, and adapted to release the lock of the selecting member when the switching member reaches a chucking completion position.

In accordance with the described arrangement, the selecting member is locked at the disk mounting position by the switching member during the disk loading and ejecting operations, whereby the disk mounting mechanism can be reliably kept coupled to the driving side. In addition, the lock of the selecting member is released upon completion of chucking by the switching member, whereby the disk mounting mechanism can be separated from the driving side, and the selecting member can be moved to the pickup feed position.

In the disk player in accordance with the present invention, the optical pickup may preferably be adapted to locate at the innermost peripheral position that is further inside of an inner peripheral position on the inner periphery side of an information recording area of a disk where optical disk signals are readable during the operation of the disk mounting mechanism. In addition, the optical pickup may preferably be adapted to hold the pickup feeding lock means on a lock release side when located at the innermost peripheral position. Further, the optical pickup may preferably be adapted to release the pickup feeding lock means so as to lock the selecting member at the pickup feed position by the pickup feeding lock means when located at the inner peripheral position and on the outside of the inner peripheral position.

In accordance with the described arrangements, the selecting member is locked at the pickup feed position by the pickup feeding lock means during the disk playback operation and the return operation of the optical pickup, whereby the pickup feeding mechanism can be reliably kept coupled to the driving side. In addition, the lock of the selecting member is released when the optical pickup reaches the inside of the inner peripheral position during its return operation, whereby the pickup feeding mechanism can be separated from the driving side, and the selecting member can be moved to the disk mounting position.

The disk player of the present invention may preferably further include a detection element which is adapted to detect the optical pickup located at the inner peripheral position on the inner periphery side of an information recording area of a disk where optical disk signals are readable, and is adapted to detect the completion of chucking of the disk on the turntable with the operation of the optical pickup.

In the disk player in accordance with the present invention, the optical pickup may preferably be adapted to locate at the innermost peripheral position that is further inside of the inner peripheral position during the operation of the disk mounting mechanism. In addition, the detection element may preferably be adapted to detect the completion of chucking of the disk when the optical pickup moves from the innermost peripheral position towards the outside to reach the outer position of the inner peripheral position after the completion of operation of the disk mounting mechanism, and may preferably be adapted to detect the optical pickup located at the inner peripheral position when the optical pickup moves towards the inside of the disk to reach the inner peripheral position.

In accordance with the described arrangements, during the shift from the disk loading operation to the disk playback operation, the optical pickup is moved to a position slightly outside of the inner peripheral position to detect the inner periphery of the optical pickup and then, the optical pickup is returned to the inner peripheral position again, thereby detecting the inner periphery of the optical pickup. Therefore, both the completion of chucking and the inner periphery of the optical pickup can be reliably detected only by adding a reciprocating operation in a short distance near the peripheral position to the optical pickup when the optical pickup moves to the outside.

In the disk player in accordance with the present invention, the selecting mechanism may preferably have a selecting member which moves between a disk mounting position to transmit the driving force to the disk mounting mechanism and a pickup feed position to transmit the driving force to the pickup feeding mechanism. The disk mounting mechanism may preferably have a disk mounting lock means for locking the selecting member at the disk mounting position during a disk mounting operation. The pickup feeding mechanism may preferably have a pickup feeding lock means for locking the selecting member at the pickup feed position during a pickup feeding operation. In addition, the optical pickup may preferably be adapted to hold the pickup feeding lock means on a lock release side when located at the innermost peripheral position, and may be adapted to release the pickup feeding lock means so as to lock the selecting member to the pickup feed position by the pickup feeding lock means when located on the inner peripheral position and on the outside of the inner peripheral position.

In accordance with the described arrangements, the selecting member is locked at the disk mounting position by the disk mounting lock means during the disk loading and ejecting operations, whereby the driving side can be reliably kept coupled to the disk mounting mechanism. In addition, the selecting member is locked at the pickup feed position by the pickup feeding lock means during the disk playback operation and the return operation of the optical pickup, whereby the driving side can be reliably kept coupled to the pickup feeding mechanism. Further, the pickup feeding mechanism can be reliably separated from the driving side with the operation of the optical pickup at the completion of the disk playback operation. On the other hand, after the optical pickup has reached the inner peripheral position after the completion of the disk loading operation, the driving side can be reliably kept coupled to the pickup feeding mechanism by the pickup feeding lock means, so that the pickup feeding mechanism is not inconveniently separated from the driving side even if the optical pickup is returned to the inner peripheral position for the detection of the inner periphery of the optical pickup. Therefore, the optical pickup can be reliably moved to the outside following the detection of the inner periphery of the optical pickup, whereby the disk playback operation can be smoothly started.

In the disk player in accordance with the present invention, the detection element may preferably be a detection switch. The detection switch is arranged so as to be pressed by the optical pickup when the optical pickup is located within the range of the innermost peripheral position to the inner peripheral position, and separated from the optical pickup when the optical pickup moves to the outside from the inner peripheral position.

In accordance with the described arrangement, the operating position of the optical pickup can be mechanically reliably detected by the detection switch.

In the disk player of the present invention, the pickup feeding mechanism may preferably have a lead screw which is engaged with one end of the optical pickup to linearly actuate the optical pickup, and the detection element may be arranged on the opposite side of the lead screw with respect to the optical pickup.

In accordance with the described arrangement, the detection element is provided around the optical pickup, particularly in an area having a relatively wide open space that is opposite to the lead screw. Therefore, the disk player offers the advantages of increased versatility of the arrangement of the detection element and of having little effect on the arrangement and design of other members.

In the disk player in accordance with the present invention, the selecting mechanism may preferably include the following driving gear, idler plate, and idler gear. The driving gear is adapted always to be coupled to the single driving source, and rotated by the driving force from the driving source. This an idler plate is provided as the selecting member to be pivoted between the disk mounting position and the pickup feed position by a friction generated between the idler plate and the driving gear in response to the direction of rotation of the driving gear. In addition, the idler gear is provided on one end of the idler plate so as to be always coupled to the driving gear, rotated with respect to the driving gear in response to the pivot of the idler plate, coupled to the disk mounting mechanism when the idler plate is located on the disk mounting position, and coupled to the pickup feeding mechanism when the idler plate is located on the pickup feed position.

In accordance with the described arrangements, the position of the idler plate is switched by a simple configuration using the driving gear, idler plate, and idler gear, whereby either of the disk mounting mechanism and the pickup mounting mechanism can be reliably coupled to the driving source.

In the disk player in accordance with the present invention, the idler gear may include the following disk mounting idler gear and pickup feeding idler gear. The disk mounting idler gear is coupled to the disk mounting mechanism when the idler plate is located on the disk mounting position. The pickup feeding idler gear is separately provided from the disk mounting idler gear so as to be coupled to the pickup feeding gear when the idler plate is located on the pickup feed position.

In accordance with the described arrangements, individual idler gears can be arranged at convenient positions for the disk mounting mechanism and the pickup feeding mechanism, so that the versatility of the design can be increased.

In the disk player in accordance with the present invention, the disk mounting mechanism may preferably include the following switching control mechanism and transporting roller-actuating mechanism. The switching control mechanism switches a damper member which chucks the disk on the turntable between a chucking side and a release side, and switches a transporting roller for horizontally transporting the disk onto the turntable between a disk abutting side and a release side. The transforming roller-actuating mechanism rotationally actuates the transporting roller. On the other hand, the idler gear may preferably include a switching idler gear, a transporting roller-actuating idler gear, and a pickup feeding idler gear. The switching idler gear is adapted to be coupled to the switching control mechanism when the idler plate is located on the disk mounting position. The transporting roller-actuating idler gear is provided separately from the switching idler gear so as to be coupled to the transporting roller-actuating mechanism when the idler plate is located on the disk mounting position. In addition, the pickup feeding idler gear is provided separately from the switching idler gear and the transporting roller-actuating idler gear so as to be coupled to the pickup feeding gear when the idler gear is located on the pickup feeding position.

In accordance with the described arrangements, individual idler gears can be arranged at convenient positions for the switching control mechanism, the transporting roller-actuating mechanism, and the pickup feeding mechanism, so that the versatility of the design can be increased.

DESCRIPTION OF THE PREFERRED EMBODIMENTS

Preferred embodiments to which the present invention is applied will now be specifically described with reference to the accompanying drawings.

First Embodiment

[Configuration]

Figure 1A:
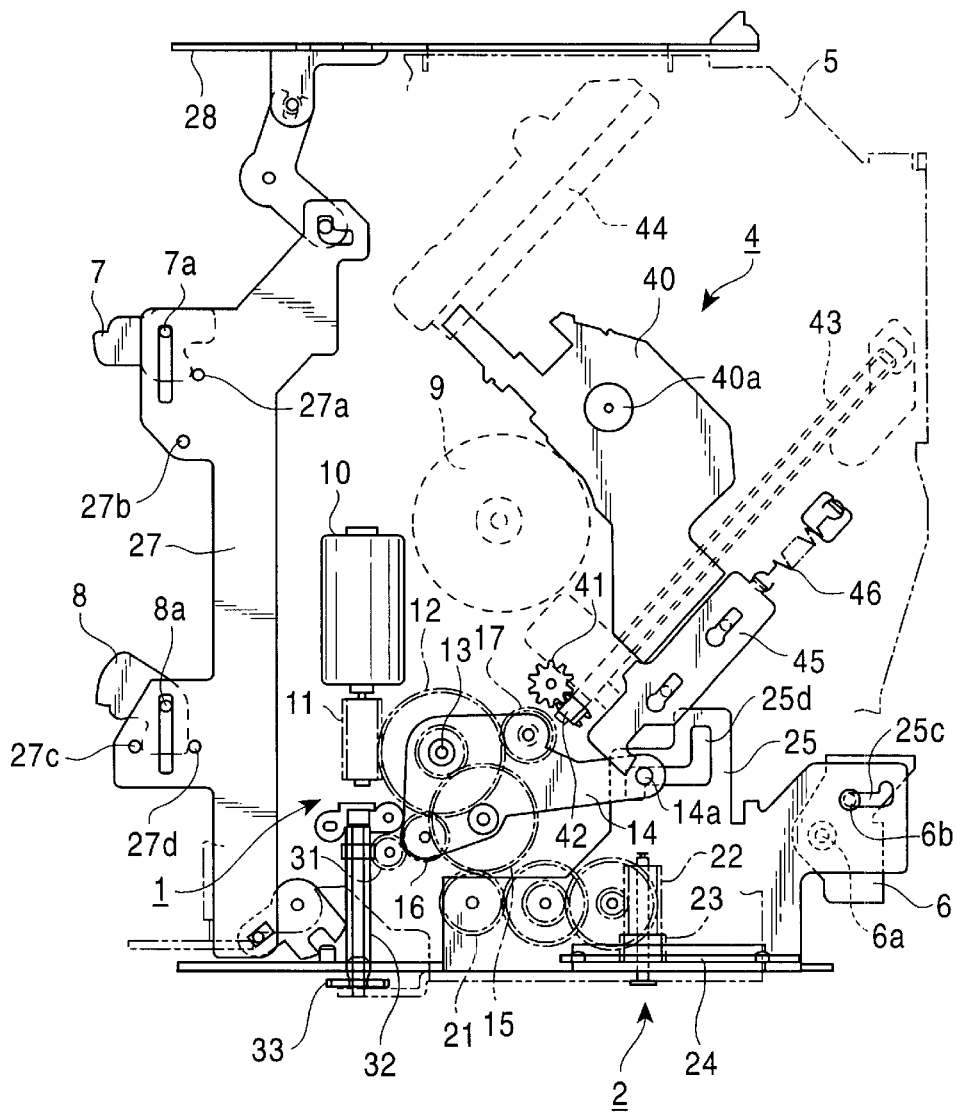
FIG. 1A is a plan view.
Figure 1B:
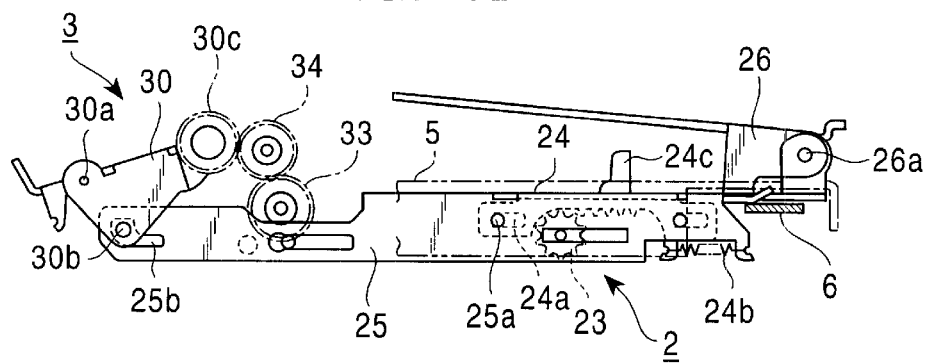
FIG. 1B is a side view each showing an initial state of a disk player in accordance with a first embodiment of the present invention.

FIG. 1A is a front view and FIG. 1B is a side view each showing an initial state of a disk player in accordance with a first embodiment of the present invention. For simplicity of the drawings, only main members are shown in FIGS. 1A and 1B.

As shown in FIGS. 1A and 1B, in a disk player in accordance with an embodiment of the present invention, a selecting mechanism 1 is provided in order to transmit a driving force of a loading motor (driving source) 10 selectively to a switching control mechanism 2, a transporting roller-actuating mechanism 3, and a pickup feeding mechanism 4. Since both the switching control mechanism 2 and the transporting roller-actuating mechanism 3 are configured so as to individually receive the driving force from the selecting mechanism 1, they will be described as separate mechanisms for reasons of convenience, although they are components of a disk mounting mechanism. A base plate 5 supports these mechanisms 1 to 4, and a loading motor 10.

The mechanisms configured on the base plate 5 are supported in a floating state on a chassis (not shown) during a disk playback, and are fixed in place on the chassis by a damper lock plate 6 and floating lock plates 7 and 8 provided on a base plate 5 in the initial state shown in FIG. 1A. The base plate 5 is shown by a two-dot chain line in the drawing in order to be distinguished from other members, and is suitably omitted for simplicity of the drawing. A disk drive motor 9 is direct-coupled to a turntable to rotate the disk. Detailed configurations of the mechanisms including the selecting mechanism 1 will now be described.

[Selecting Mechanism]

As shown in FIG. 1A, a worm wheel (driving gear) 12 is arranged in the vicinity of the loading motor 10 to always mesh with a worm 11 that is provided on a shaft of the loading motor 10. The worm wheel 12 includes integrated large and small gears, and always meshes with the worm 11 via a large-diameter gear thereof. An idler plate (selecting member) 14 that is pivotable about a shaft 13 of the worm wheel 12 is provided at a position overlapping the worm wheel 12 so that certain friction is exerted between the idler plate 14 and the worm wheel 12.

The idler plate 14 is formed by a substantially square section overlapping the worm wheel 12 and a protruded section extended from the substantially square section. The idler plate 14 is fitted to the shaft 13 at one corner of the substantially square section, and idler gears 15 to 17 are fitted to the other three corners for transmitting the driving force to the switching control mechanism 2, the transporting roller-actuating mechanism 3, and the pickup feeding mechanism 4, respectively. Each of the idler gears 15 to 17 always mesh with the worm wheel 12, so that it is turned with respect to the worm wheel 12 in response to the pivot of the idler plate 14, and is coupled to the corresponding mechanism.

Figure 7A:
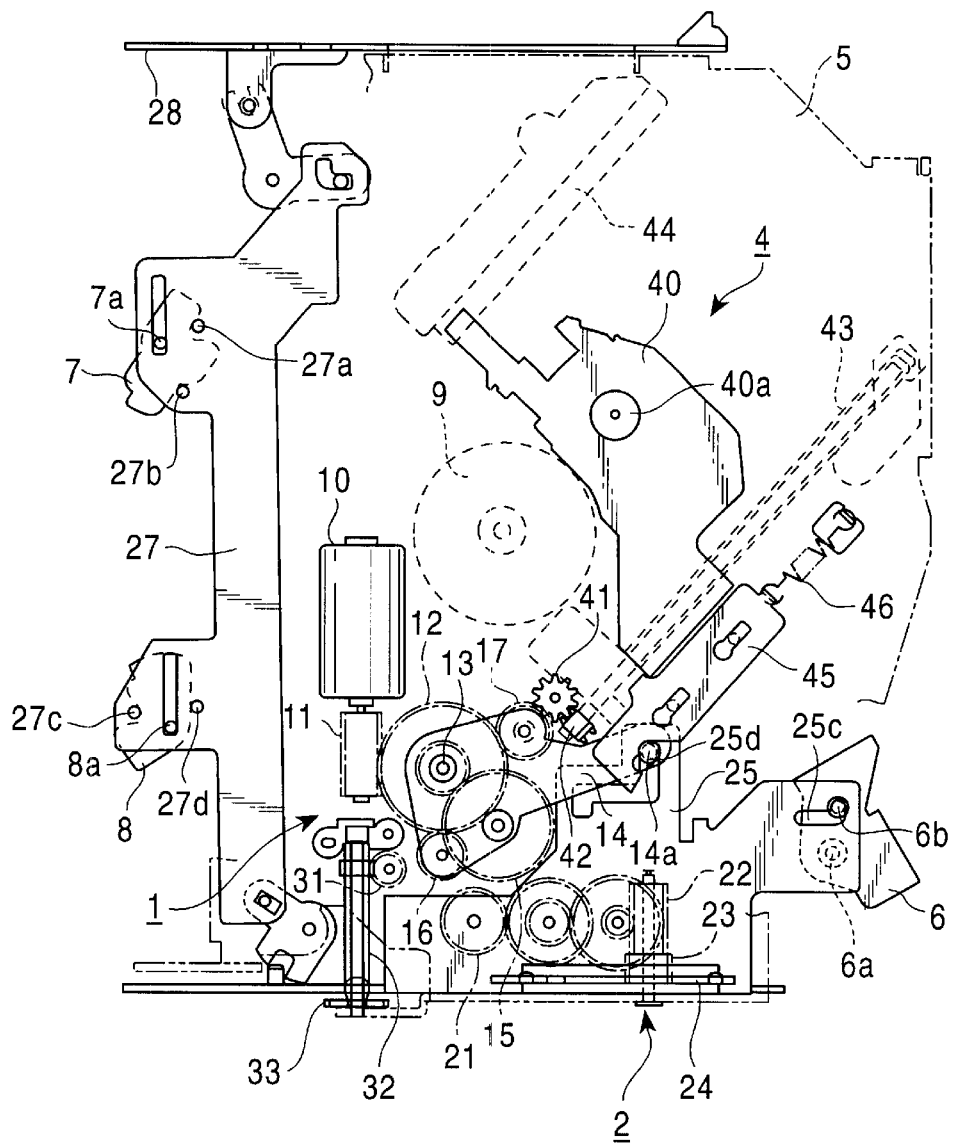
FIG. 7A is a plan view.
Figure 7B:
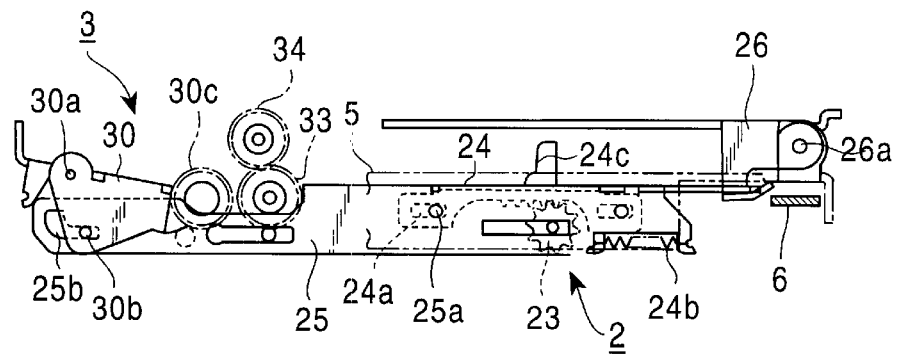
FIG. 7B is a side view each showing a state of the disk player in accordance with the first embodiment in which an idler plate pivots to a pickup feed position from the state shown in FIGS. 6A and 6B to perform switching of actuation.

That is, the idler gear 14 pivots between a disk mounting position to connect the switching idler gear 15 to the switching control mechanism 2 and to connect the transporting roller-actuating idler gear 16 to the transporting roller-actuating mechanism 3, as shown in FIG. 1A, and a pickup feed position to connect the idler gear 17 to the pickup feeding mechanism 4, as shown in FIG. 7A. A position-controlling pin 14a is attached to a terminal end of the protruded section of the idler plate 14.

[Switching Control Mechanism]

As shown in FIG. 1A, the switching control mechanism 2 includes a switching gear 21 capable of meshing with the idler gear 15 of the selecting mechanism 1. A horizontal rotational driving force of the switching gear 21 is converted into a vertical rotational driving force via a driving force conversion mechanism 22 consisting of a plurality of gears including intersecting gears so as to be transmitted to a pinion 23 that is integrally formed with one of the intersecting gears. The pinion 23 is adapted to linearly actuate a shift plate (switching member) 25 via a rack plate 24.

The rack plate 24 is arranged so as to overlap the shift plate 25, and both plates 24 and 25 can be moved in relation to each other by a guide structure that is formed by a pair of guide slots 24a and a pair of pins 25a in combination. The rack plate 24 is biased to the side overlapping the shift plate 25 by a spring 24b provided between the rack plate 24 and the shift plate 25. The rack plate 24 has a trigger-engaging portion 24c. That is, in the initial state, the rack plate 24 is not meshed with the pinion 23, as shown in FIG. 1B, and the trigger-engaging portion 24c thereof is pressed by a trigger upon completion of horizontal transportation of the disk, whereby the rack plate 24 is moved leftward in the drawing to mesh with the pinion 23.

[Control Arrangement by the Shift Plate]

As shown in FIGS. 1A and 1B, a first cam slot 25b for switching a transporting roller member 30, a second cam slot 25c for switching a damper member 26 via the damper lock plate 6, and a lock slot 25d (disk mounting lock means) for controlling the position of the idler plate 14 are formed in the shift plate 25.

The damper member 26 is the member for chucking the disk on the turntable. The damper 26 is provided so that they can vertically pivot around a shaft 26a, and is biased downward (to the chucking side) by a spring (not shown). In addition, the damper plate 6 is the member for fixing the base plate 5 in place on the chassis, as described above, and for locking the damper member 26 at the upper chucking release position. The damper lock plate 6 is provided so that it can pivot around a shaft 6a, and is biased to the release side by a spring (not shown), and a pin 6b for controlling the position of the clamper member 26 is mounted on a part of the damper lock plate 6.

Further, the transporting roller member 30 is the member for rotating a roller to perform loading and ejecting operations of the disk, is provided so that it can pivot around a shaft 30a, and is biased upward (to the disk abutting side) by a spring (not shown). A pin 30b for controlling the position of the transporting roller member 30 is mounted on a part of the transporting roller member 30.

Control arrangements of the transporting roller member 30, the damper member 26 and the idler plate 14 by the shift plate 25 will now be described individually.

First, the pin 30b of the transporting roller member 30 is inserted into the first cam slot 25b. In the initial state shown in FIG. 1B, the shift plate 25 holds the transporting roller member 30 at the upper disk abutting position. With an advance operation (operation to the left in the drawing) from the initial state, the shift plate 25 allows the transporting roller member 30 to be pivoted to the release side. During an operation shown in FIG. 4B, the shift plate 25 moves the transporting roller member 30 to the final release position and then, holds the transporting roller member 30 at the final release position.

Further, the shift plate 25 is coupled to a sub-shift plate 28 opposed to the base plate 5 via a link mechanism 27 including a plurality of links so as to move in the same direction in synchronism therewith. A cam slot (not shown) similar to the first cam slot 25b is formed in the sub-shift plate 28, and a similar pin provided on the other end of the transporting roller member 30 is inserted therein. Both ends of the transporting roller member 30 are supported by the sub-shift plate 28 and the shift plate 25, and the transporting roller member 30 is pivoted to the release side by the advance operation from the initial position so that the transporting roller member 30 is finally held at the release position.

The pin 6b of the clamper lock plate 6 is inserted into the second cam slot 25c of the shift plate 25. In the initial state shown in FIG. 1A, the shift plate 6 is adapted to hold the damper lock plate 6 at the initial pivot position (floating lock position), and to bring the damper lock plate 6 into abutment with the lower surface of the damper member 26 so as to lock the damper member 26 at the upper chucking release position, as shown in FIG. 1B. In addition, in the latter of the advance operation shown in FIG. 5A, the shift plate 25 starts the pivot of the damper lock plate 6 to release the floating lock. Thereafter, at the chucking completion position shown in FIG. 6A, the shift plate 25 is adapted to move the damper lock plate 6 to a pivot position on the chucking side, and to release the damper member 26 from the damper lock plate 6, as shown in FIG. 6B so that the damper lock plate 6 is moved to the lower chucking position by a biasing force of a spring (not shown).

On the other hand, the pin 14a of the idler plate 14 is inserted into the lock slot 25d of the shift plate 25. The shift plate 25 is adapted to lock the idler plate 14 at the disk mounting position during a shift from the initial position shown in FIG. 1A to the disk mounting completion position shown in FIG. 6A and then, to release the idler plate 14.

In the initial position shown in FIG. 1A, the shift plate 25 is adapted to hold the damper lock plate 6 at the floating lock position by means of the second cam slot 25c, and the floating lock plates 7 and 8 in the floating lock position via the link mechanism 27, as described above. The floating lock plates 7 and 8 are pivotally provided around shafts 7a and 8a so as to be pivoted between the floating lock position shown in FIG. 1A and the release position shown in FIG. 6A. On the other hand, two pairs of position control sections 27a to 27d are mounted to the link mechanism 27 for individually controlling the positions of the floating lock plate 7 and 8 by being brought into abutment with edges of the floating lock plates 7 and 8.

Figure 4A:
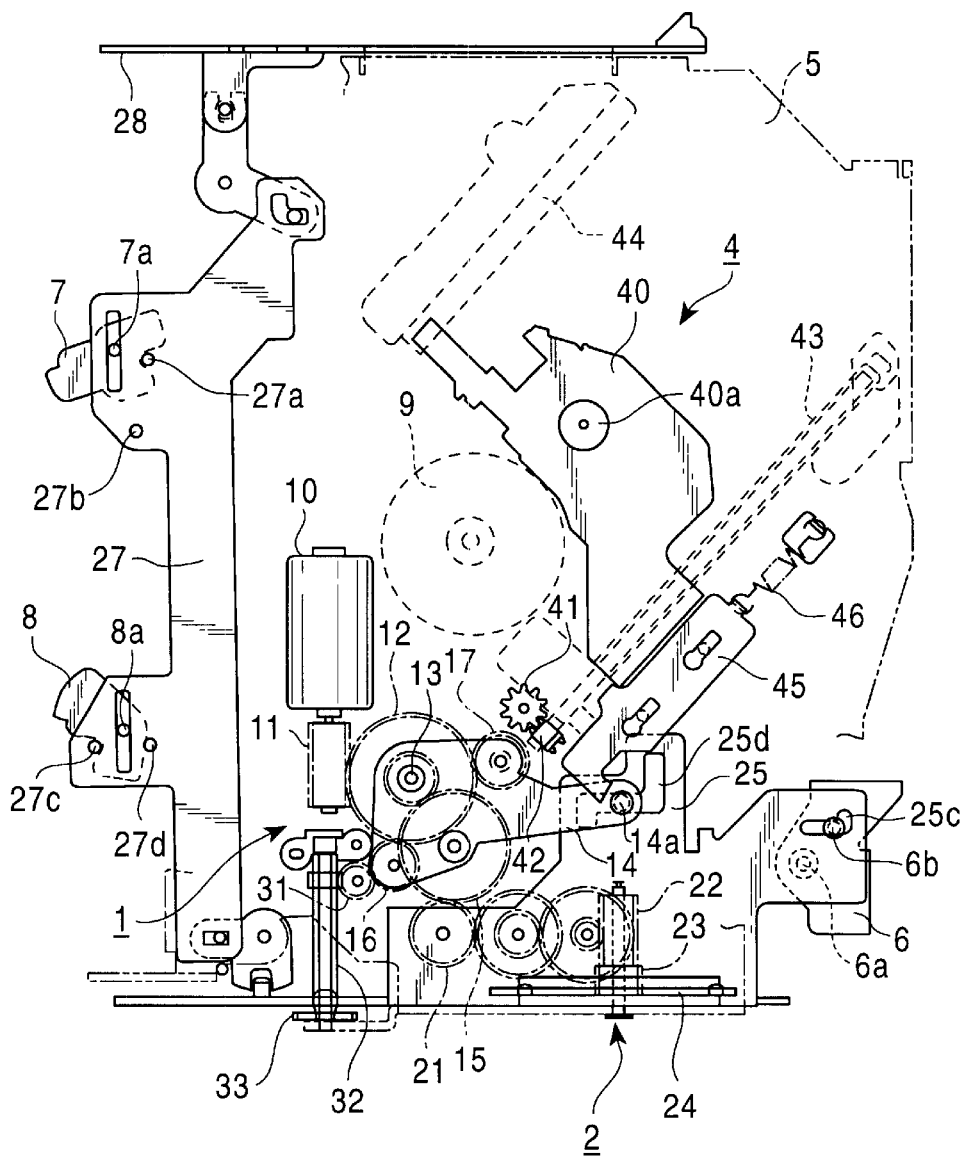
FIG. 4A is a plan view.

That is, in the initial position shown in FIG. 1A, the shift plate 25 is adapted to hold the lock plates 6 to 8 in a floating lock state, and to start the pivot of the floating lock plates 7 and 8 by the position control sections 27a and 27c during the advance operation shown in FIG. 4A so as to release the floating lock on one side of the base plate 5. Further, in the latter of the advance operation shown in FIG. 5A, the shift plate 25 is adapted to start the pivot of the damper lock plate 6 so as to release the floating lock on the other side of the base plate 5.

[Transporting Roller-actuating Mechanism]

In this embodiment, a driving force system for inserting and ejecting the disk in the horizontal direction by pivoting the transfer roller member 30 arranged on the side of a disc insertion opening of the disk player (the left-hand side of the drawing) is provided as the transporting roller-actuating mechanism 3 separated from a driving force system of the switching control mechanism 2.

As shown in FIG. 1A, the transporting roller-actuating mechanism 3 includes a transporting roller-actuating gear 31 capable of meshing with the idler gear 16 of the selecting mechanism 1. A horizontal rotational driving force of the transporting roller-actuating gear 31 is converted into a vertical rotational driving force via a driving force conversion mechanism 32 including intersecting gear and shaft so as to be transmitted to a gear 33 that is integrally formed with a shaft. As shown in FIG. 1B, a coupling gear 34 that always meshes with the gear 33 is provided above the gear 33, and the coupling gear 34 can mesh with a transporting gear 30c of the transporting roller member 30.

The transporting gear 30c is provided coaxially with a transporting roller (not shown) so as to be integrally operated with the transporting roller. The transporting gear 30c is adapted to mesh with the coupling gear 34 when the transporting roller member 30 is located on a disk abutting position, as shown in FIG. 1B. In addition, the transporting gear 30c is adapted to be rotated by the driving force of the loading motor 10 that is transmitted via the coupling gear 34 so as to rotate the transporting roller (not shown) to the loading side (in a clockwise direction in the drawing) or to the ejecting side (in a counterclockwise direction in the drawing).

[Pickup Feeding Mechanism]

As shown in FIG. 1A, the pickup feeding mechanism 4 for moving an optical pickup 40 in a radial direction of the disk includes a pickup feeding gear 41 capable of meshing with the idler gear 17 of the selecting mechanism 1. A horizontal rotational driving force of the pickup feeding gear 41 is converted into an orthogonal rotational driving force via a driving force conversion mechanism 42 including intersecting helical gears so as to be transmitted to a lead screw 43.

The optical pickup 40 is directly engaged with the lead screw 43 at its one end so as to be linearly actuated in the axial direction of the lead screw 43 by the rotation of the lead screw 43. In addition, the other end of the optical pickup 40 is slidably supported by a slide guide 44. The optical pickup 40 is actuated within the range of the innermost peripheral position shown in FIGS. 1A, 2A, 3A, 4A, 5A, 6A, and 7A to the outermost peripheral position shown in FIG. 9A via the inner peripheral position shown in FIG. 8A.

The inner peripheral position is the position set so that the optical pickup 40 always firstly starts reading in the disk playback operation, and the position where the TOC information, which is administrative information recorded in the inner peripheral area (read-in area) of an information recording area in the disk, can be read by a pickup lens 40a. The innermost position is the position located further inside of the inner peripheral position where the optical disk signals are unreadable.

Further, the pickup feeding mechanism 4 is provided with an idler lock plate (pickup feeding lock means) 45 that is engaged with the pin 14a of the idler plate 14 to lock the idler plate 14 at a pickup feed position. The idler lock plate 45 is provided movably in parallel with the optical pickup 40. The idler lock plate 45 is configured so as to be biased to the lock side by a spring 46 and engaged with a part of the optical pickup 40.

The idler lock plate 45 is adapted to be engaged with the optical pickup 40 when the optical pickup 40 is located at the innermost peripheral position shown in FIGS. 1A, 2A, 3A, 4A, 5A, 6A, and 7A. When the optical pickup 40 moves from the innermost peripheral position to the inner peripheral position shown in FIG. 8A, the idler lock plate 45 is adapted to be disengaged from the optical pickup 40, moved to the lock side by a biasing force of the spring 46, and engaged with the pin 14a of the idler plate 14 so as to lock the idler plate 14 at the pickup feed position.

[Operation]

In the disk player of this embodiment having the configuration as described above, both the disk mounting mechanism including the switching control mechanism 2 and the transporting roller-actuating mechanism 3, and the pickup feeding mechanism 4 can be actuated by the selecting mechanism 1 of the present invention with the driving force of the single loading motor 10. The initial state, a series of operations from the disk loading operation to the disk playback operation, and the disk ejecting operation will now be described with reference to FIGS. 1 to 9.

[Initial State]

In the initial state, as shown in FIG. 1A, since the idler lock plate 45 is held at the release position by the optical pickup 40 located at the innermost peripheral position and the pin 14a of the idler plate 14 is located at the lock section of the lock slot 25d of the shift plate 25, the idler plate 14 is locked at the disk mounting position. As a result, the idler gear 15 meshes with the switching gear 21, and the idler gear 16 meshes with the transporting roller-actuating gear 31.

In this case, the transporting roller member 30 is located at the upper disk abutting position by means of the first cam slot 25b of the shift plate 25, and the transporting gear 30c meshes with the coupling gear 34, so that the transporting gear 30c is coupled to the transporting roller-actuating gear 31. On the other hand, in the switching control mechanism 2, the rack plate 24 is not meshed with the pinion 23, so that the shift plate 25 is separated from the switching gear 21.

Further, since the shift plate 25 is located at the initial position, the clamper lock plate 6, and the floating lock plates 7 and 8 are held at the floating lock position. Since the clamper lock plate 6 is held at the floating lock position, the clamper member 26 is also locked at the upper chucking release position.

[Disk Loading and Playback Operations]

1) Horizontal Transportation of the Disk

In the initial state as described above, when the disk is inserted from the side of the disk insertion opening of the disk player (the left-hand side of the drawing), the loading motor 10 is started by a loading motor start command made by the disk detection elements. By the driving force of the loading motor 10, the worm wheel 12 is rotated in a counterclockwise direction, the transporting roller-actuating gear 31 is rotated in a counterclockwise direction via the clockwise rotation of the idler gear 16, and the transporting gear 30c being coupled to the transporting roller-actuating gear 31 is rotated in a clockwise direction. As a result, the transporting roller (not shown) integrally operated with the transporting gear 30c is rotated to the loading side (in a clockwise direction in the drawing) to horizontally transport the inserted disk onto the turntable. The driving force of the loading motor 10 is also transmitted to the switching gear 21 via the idler gear 15 of the selecting mechanism 1, so that the pinion 23 that is always coupled to the switching gear 21 is rotated during the horizontal transportation of the disk.

2) Start of the Shift Plate; Release of the Transporting Roller

When the disk is transported onto the turntable by the operation of the transporting roller-actuating mechanism 3, the rack plate 24 is moved leftward in the drawing to be meshed with the pinion 23 by a trigger of operating members related to the positioning upon completion of the horizontal transportation of the disk. At this time, the pinion 23 is rotated in the counterclockwise direction by the driving force of the loading motor 10, so that the rack plate 24 starts to advance leftward in the drawing. In this case, the rack plate 24 advances by a moving distance in relation to the shift plate 25 that is defined by the guide slot 24a and the pin 25a, and engages with the shift plate 25 (see FIGS. 2A and 2B).

Figure 3A:
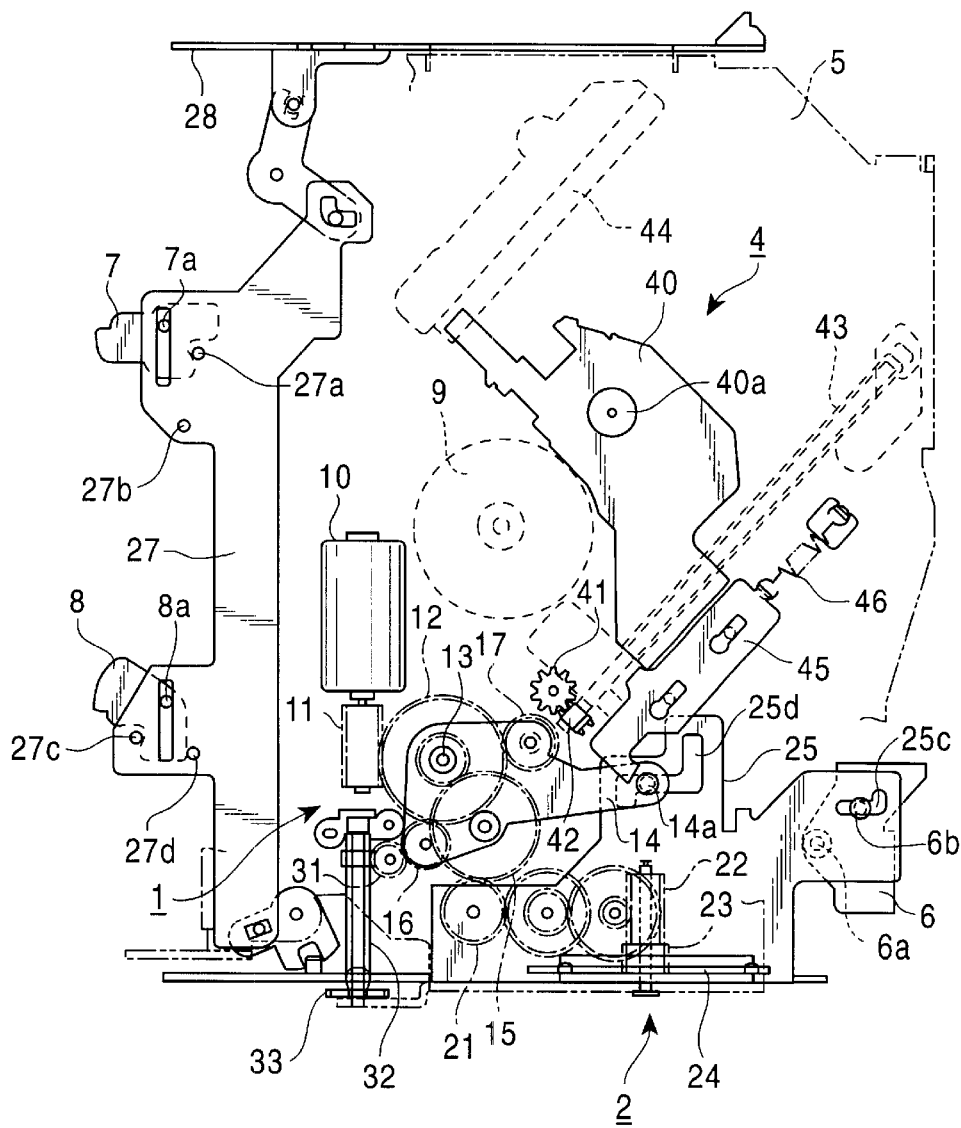
FIG. 3A is a plan view.
Figure 3B:
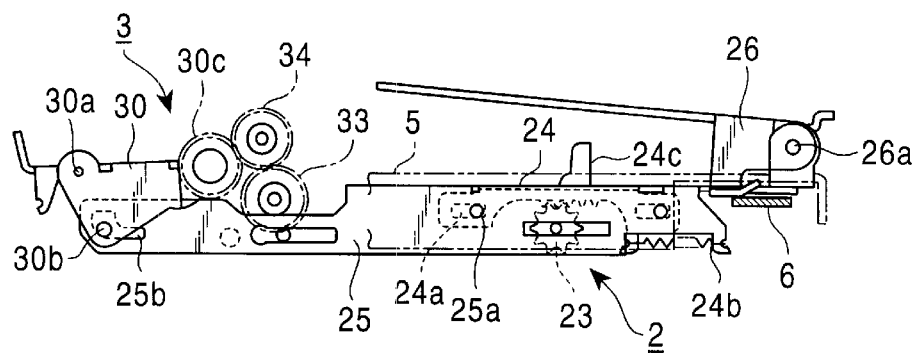
FIG. 3B is a side view each showing a state of the disk player in accordance with the first embodiment in which the shift plate advances from the state shown in FIGS. 2A and 2B to start a release operation of a transporting roller.

Thereafter, the rack plate 24 and the shift plate 25 integrally advance, and the pin 30b of the transporting roller member 30 is pressed downward by a cam section of the first cam slot 25b of the shift plate 25, so that the transporting roller member 30 starts downward pivoting to the release side (see FIGS. 3A and 3B). The idler plate 14 is reliably locked at the disk mounting position because the pin 14a moves in a lock section of the lock slot 25d during the operation of the shift plate 25.

3) Release of the Floating Lock; Start of Chucking

When the shift plate 25 advances from the state shown in FIGS. 3A and 3B to reach substantially a midpoint of the operating stroke, the pin 30b of the transporting roller member 30 reaches a switching point of the cam section and a relief section in the first cam slot 25b, so that the transporting roller member 30 reaches the final release position. Thereafter, since the pin 30b horizontally moves within the relief section of the first cam slot 25b, the transporting roller member 30 is held at the final release position. At the time when the transporting roller member 30 reaches the final release position, the floating lock plates 7 and 8 are pressed by position control sections 27a, 27c of the link mechanism 27 to start pivoting, so that the floating lock of one side of the base plate 5 is released. On the other hand, the clamper lock plate 6 is still held at the floating lock position, and the damper member 26 is locked at the upper chucking release position.

Figure 4B:
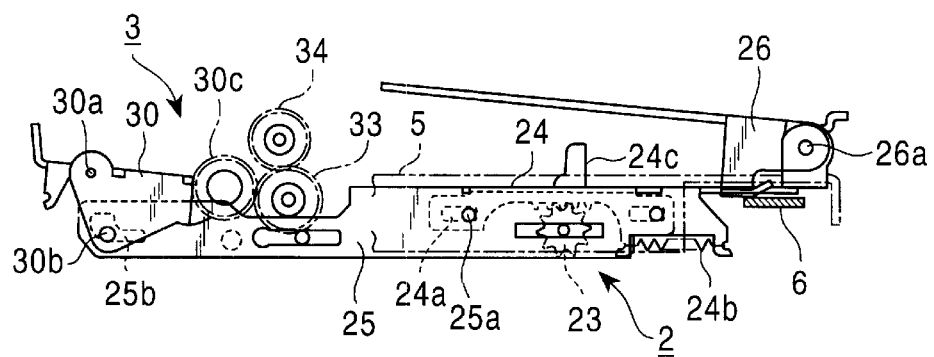
FIG. 4B is a side view each, showing a state of the disk player in accordance with the first embodiment in which the shift plate advances from the state shown in FIGS. 3A and 3B to start a release operation of a floating lock.
Figure 5A:
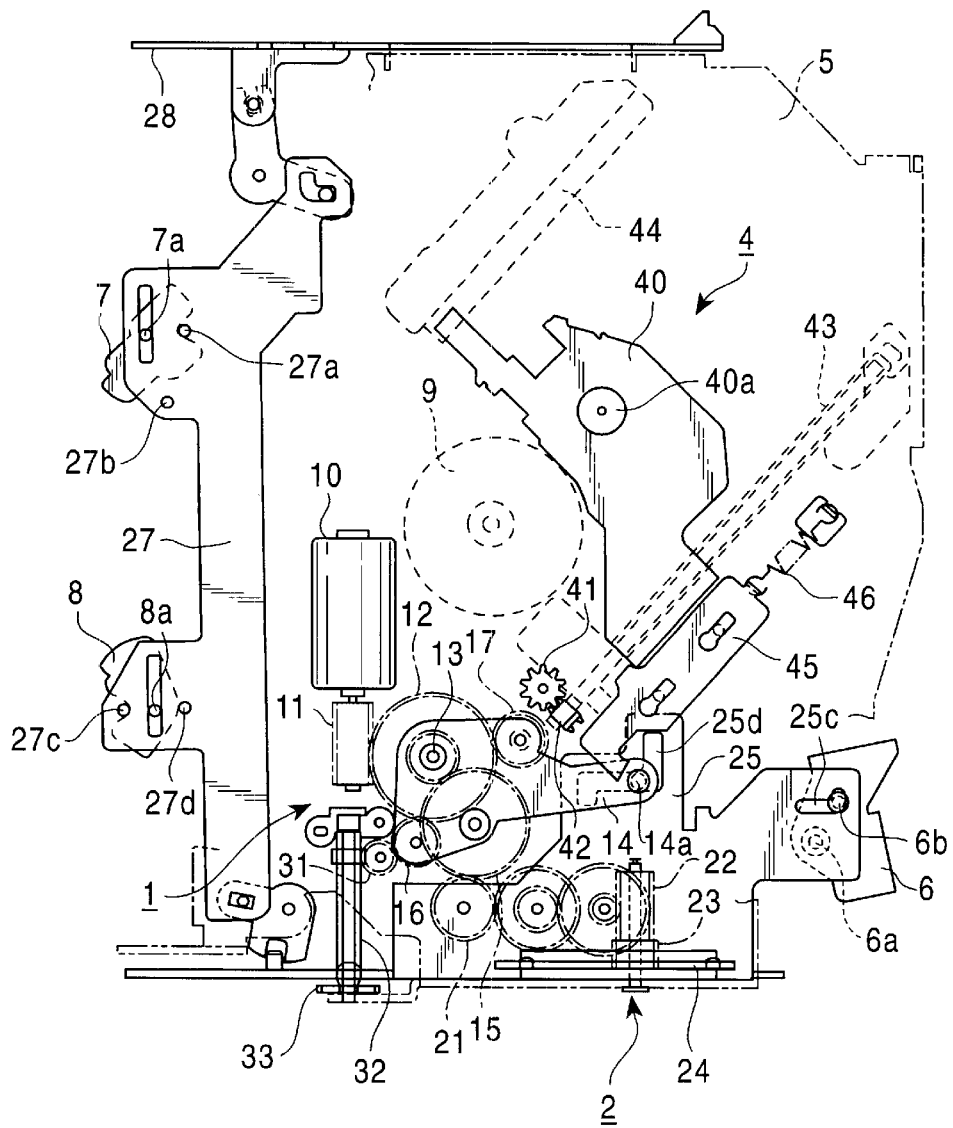
FIG. 5A is a plan view.

When the shift plate 25 further advances from the state shown in FIGS. 4A and 4B to enter the latter operation, the pin 6b of the damper lock plate 6 is pressed by the second cam slot 25c of the shift plate 25 and the clamper lock plate 6 starts pivoting, as shown in FIG. 5A, so that the floating lock of the base plate 5 is completely released. Simultaneously, the damper lock plate 6 moves along a bottom inclined surface of the clamper member 26 with the pivot of the clamper lock plate 6, so that the clamper member 26 starts pivoting downward to the chucking side by a biasing force of a spring.

4) Completion of Chucking

Figure 5B:
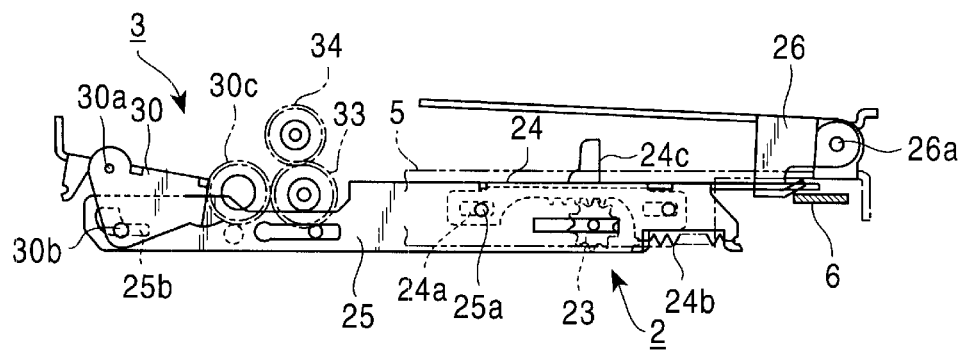
FIG. 5B is a side view each showing a state of the disk player in accordance with the first embodiment in which the shift plate advances from the state shown in FIGS. 4A and 4B to start a chucking operation.
Figure 6A:
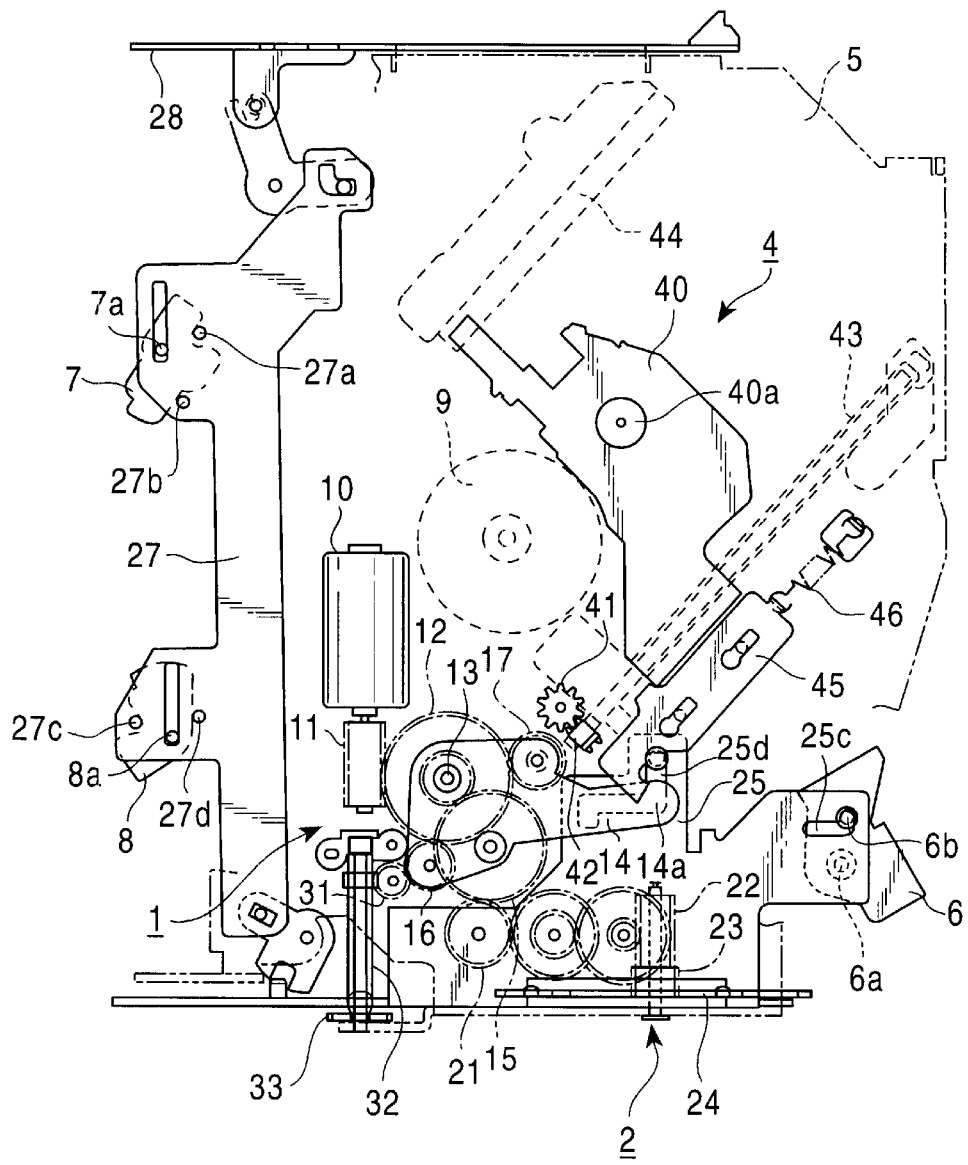
FIG. 6A is a plan view.
Figure 6B:
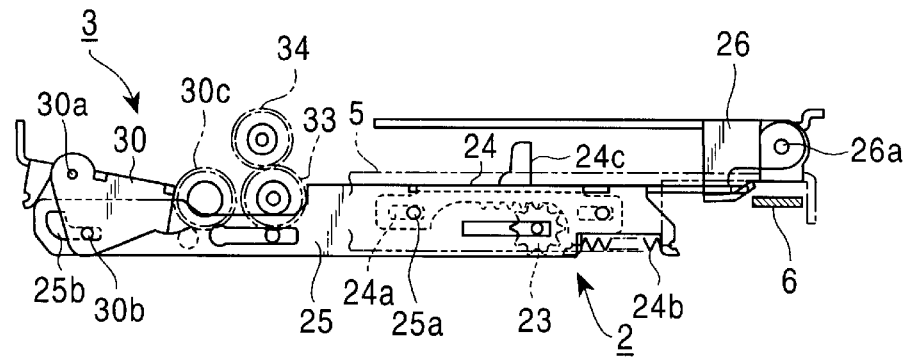
FIG. 6B is a side view each showing a state of the disk player in accordance with the first embodiment in which the shift plate reaches a forefront position from the state shown in FIGS. 5A and 5B to complete the chucking operation.

When the shift plate 25 further advances from the state shown in FIGS. 5A and 5B to reach the forefront position, the damper lock plate 6 reaches the final release position, as shown in FIG. 6A to completely release the damper member 26, as shown in FIG. 6B, so that the damper member 26 reaches the lower chucking position to chuck the disk on the turntable. At this point in time, since the pin 14a of the idler plate 14 reaches a switching point of a lock section and a relief section in the lock slot 25d of the shift plate 25, the idler plate 14 can be pivoted towards the pickup feed position.

5) Switching of Actuation

With the counterclockwise rotation of the worm wheel 12 after the shift plate 25 has reached the forefront position, the idler plate 14 is pivoted in the counterclockwise direction by a friction between the worm wheel 12 and the idler plate 14, and the pin 14a moves within the relief section of the lock slot 25d. With the pivot of the idler plate 14, the idler gear 15 is separated from the switching gear 21, and the idler gear 16 is separated from the transporting roller-actuating gear 31. When the idler plate 14 reaches the pickup feed position, the idler gear 17 meshes with the pickup feeding gear 41 of the pickup feeding mechanism 4, as shown in FIG. 7A.

6) Start of the Optical Pickup

As a result of the switching of actuation, with the counterclockwise rotation of the worm wheel 12 by the driving force of the loading motor 10, the idler gear 17 is rotated in the clockwise direction, and the pickup feeding gear 41 is rotated in the counterclockwise direction. The lead screw 43 is rotated by the rotation of the pickup feeding gear 41 to move outwards the optical pickup 40 from the innermost peripheral position shown in FIG. 7A.

7) Playback of the Disk

Figure 8A:
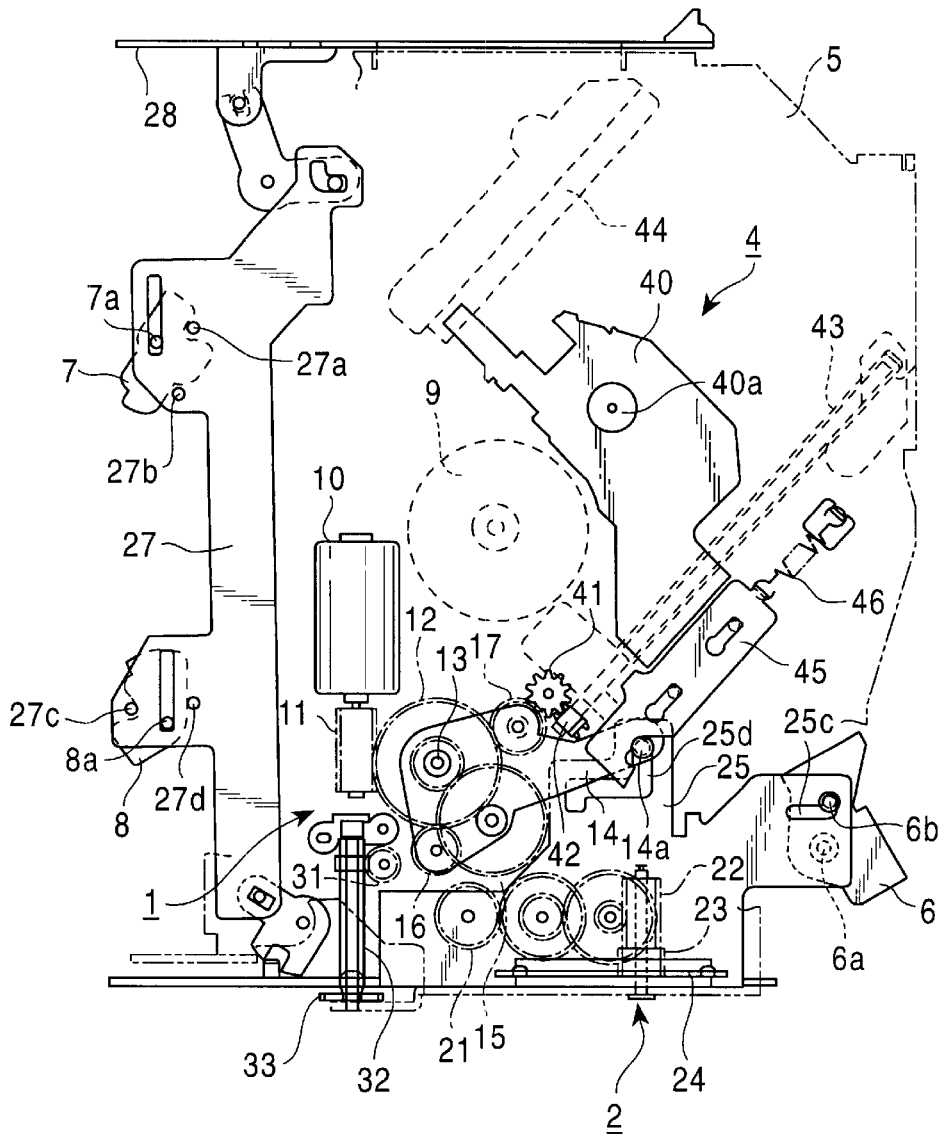
FIG. 8A is a plan view.
Figure 8B:
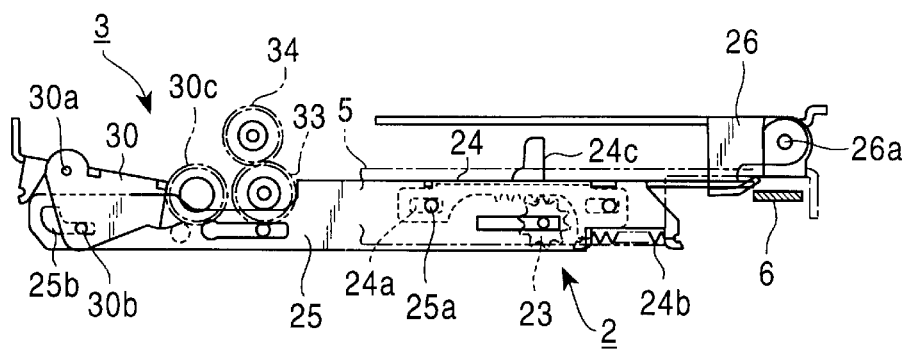
FIG. 8B is a side view each showing a state of the disk player in accordance with the first embodiment in which an optical pickup moves from the state shown in FIGS. 7A and 7B to reach an inner peripheral position.

When the optical pickup 40 that has started to move from the innermost peripheral position reaches the inner peripheral position shown in FIG. 8A, the disk drive motor 9 is started by an actuation command made by the inner peripheral detection element to start rotation of the disk. At this time, the optical pickup 40 reads the TOC information recorded in the read-in area of the signal recording area of the disk.

In addition, the idler lock plate 45 is released from the optical pickup 40 by the movement of the optical pickup 40 to the inner peripheral position, is moved to the lock side by the biasing force of the spring 46, and is engaged with the pin 14a of the idler plate 14 to lock the idler lock plate 14 at the pickup feed position. Therefore, when the optical pickup 40 is located at the inner peripheral position or at the outer position of the inner peripheral position, the idler plate 14 is reliably locked at the pickup feed position by the idler lock plate 45.

Figure 9A:
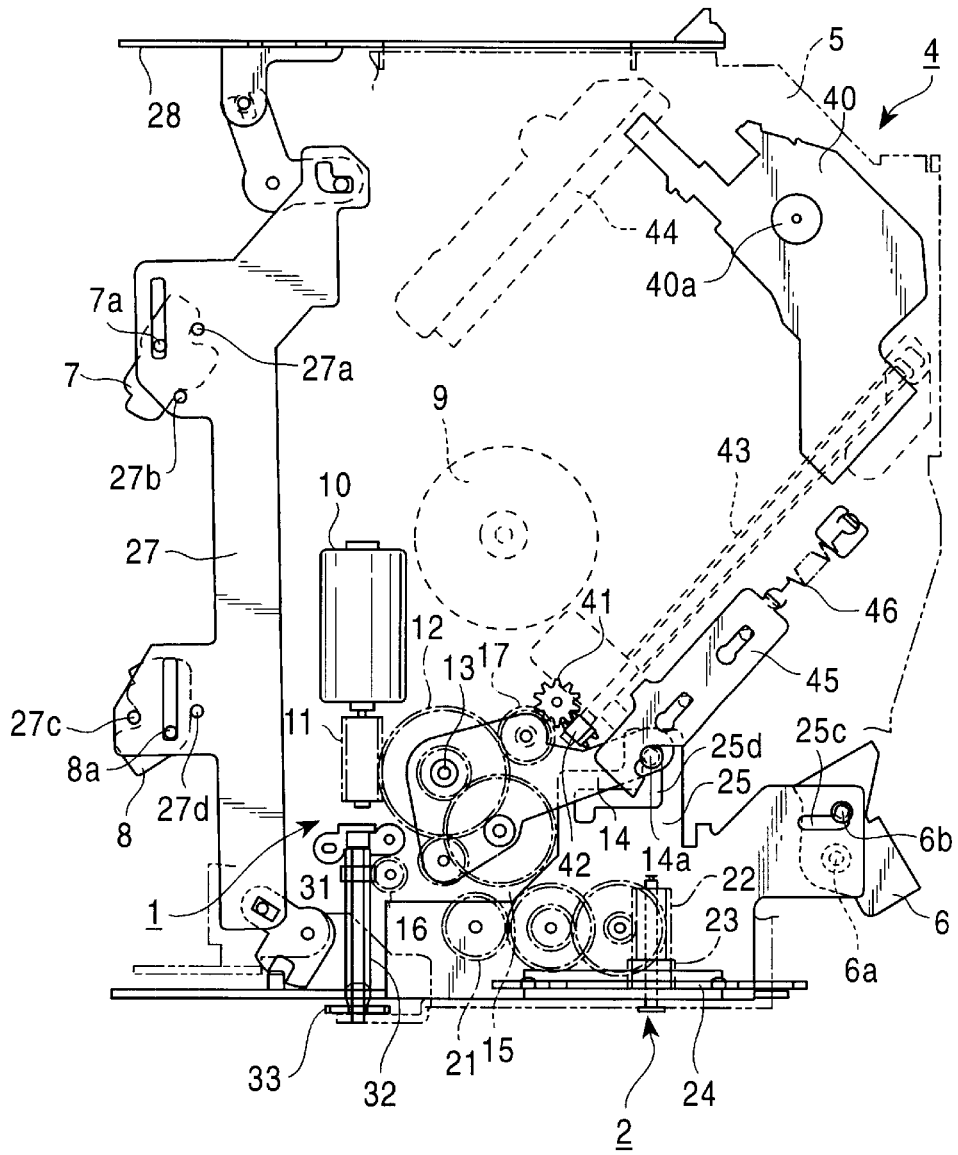
FIG. 9A is a plan view.
Figure 9B:
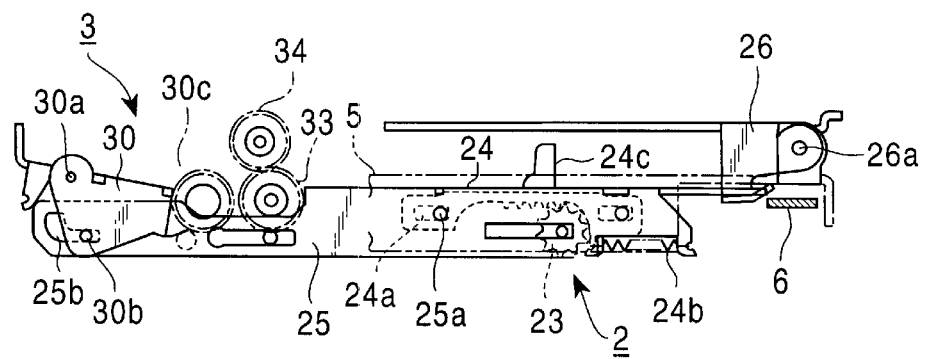
FIG. 9B is a side view each showing a state of the disk player in accordance with the first embodiment in which a disk is played back from the state shown in FIGS. 8A and 8B and then the optical pickup reaches the outermost peripheral position.

Thus, the rotation of the disk and the movement of the optical pickup 40 enable the disk playback corresponding to the amount of signals produced during the movement of the optical pickup 40 from the inner peripheral position shown in FIG. 8A to the outermost peripheral position shown in FIG. 9A.

[Return Operation of the Optical Pickup and Disk Ejecting Operation]

The return operation of the optical pickup and the subsequent disk ejecting operation after the disk playback is performed by the following reverse operations 8) to 14) to the above disk loading and playback operations 1) to 7) except that the disk drive motor 9 is not started.

8) Start of the Return Operation of the Optical Pickup

When the loading motor 10 is reversed by an ejecting command based on the ejecting operation upon completion of the disk playback, the worm wheel 12 is rotated in the clockwise direction, the pickup feeding gear 41 of the pickup feeding mechanism 4 is rotated in the clockwise direction by the driving force of the loading motor 10. Thus, the lead screw 43 is rotated in the direction opposite to the direction during the disk loading, and the optical pickup 40 starts moving inward at high speed from the outer peripheral position.

9) Completion of the Return Operation of the Optical Pickup

When the optical pickup 40 that has started to move at high speed reaches the inner peripheral position shown in FIG. 8A, release of the idler plate 14 from the idler lock plate 45 is started. During the movement to the innermost peripheral position shown in FIG. 7A, the optical pickup 40 moves the idler lock plate 45 to the release position in engagement therewith, so that the idler plate 14 is released from the idler lock plate 45.

10) Switching of Actuation

With the clockwise rotation of the worm wheel 12 after the optical pickup 40 has reached the innermost peripheral position as described above, the idler plate 14 is pivoted in the clockwise direction by the friction between the worm wheel 12 and the idler plate 14, and the pin 14a moves within the relief section of the lock slot 25d of the shift plate 25. With the pivot of the idler plate 14, the idler gear 17 is separated from the pickup feeding gear 41. When the idler plate 14 reaches the disk mounting position, the idler gear 15 meshes with the switching gear 21, and the idler gear 16 meshes with the transporting roller-actuating gear 31, as shown in FIG. 6A.

11) Release Chucking

As a result of the switching of the actuation as described above, with the clockwise rotation of the worm wheel 12 by the driving force of the loading motor 10, the pinion 23 is rotated, and the rack plate 24 and the shift plate 25 integrally start retraction. With the retraction of the shift plate 25, the damper lock plate 6 starts pivoting to the lock side, as shown in FIG. 5A, and the damper member 26 starts pivoting towards the upper chucking release position, as shown in FIG. 5B.

At this point in time, since the pin 14a is located within the lock section of the lock slot 25d, as shown in FIG. 5A, the idler plate 14 is held at the disk mounting position over the subsequent retracting action of the shift plate 25. Incidentally, at this point in time, the transporting roller member 30 is located on the lower release position and the transporting gear 30c is separated from the transporting roller-actuating gear 31, so that the transporting roller is not rotated.

12) Completion of Release of Floating Lock and Chucking

When the shift plate 25 further retracts from the state shown in FIGS. 5A and 5B to reach substantially a midpoint of the operating stroke, the damper lock plate 6 reaches the floating lock position and the damper member 26 reaches the upper release position, as shown in FIG. 4A. At this point in time, the floating lock plates 7 and 8 also start pivoting towards the floating lock side by the position control sections 27a and 27c of the link mechanism 27. In addition, at this point in time, the pin 30b of the transporting roller member 30 reaches the switching point of the cam section and the relief section in the first cam slot 25b, as shown in FIG. 4B, so that the transporting roller member 30 can be pivoted by the further retraction of the shift plate 25.

When the shift plate 25 further retracts from the state shown in FIGS. 4A and 4B to return near the initial position, the floating lock plates 7 and 8 reach the floating lock positions, as shown in FIG. 3A. As a result, the mechanisms constructed on the base plate 5 are fixed to the chassis in place. In addition, at this point in time, the transporting roller member 30 starts pivoting upwards because it is biased to the disk abutting side by the spring (not shown), and the transporting gear 30c meshes with the coupling gear 34. As a result, the transporting roller integrally operated with the transporting gear 30c starts rotating to the ejecting side (in the counterclockwise direction in the drawing). Since the transporting roller has not yet abutted against the disk at this point in time, however, the disk is not transported.

13) Stop of the Shift Plate and Abutment of the Transporting Roller

Figure 2A:
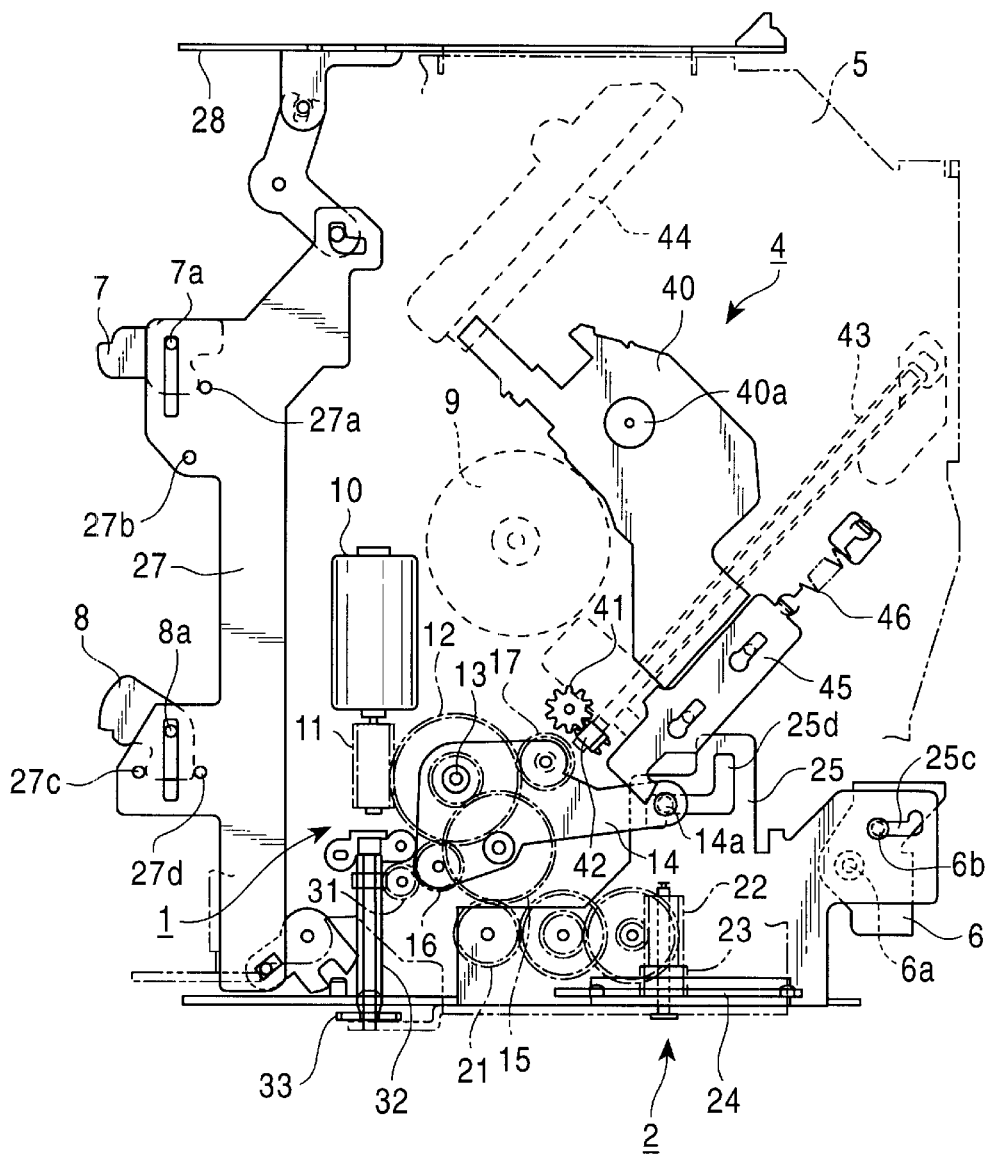
FIG. 2A is a plan view.
Figure 2B:
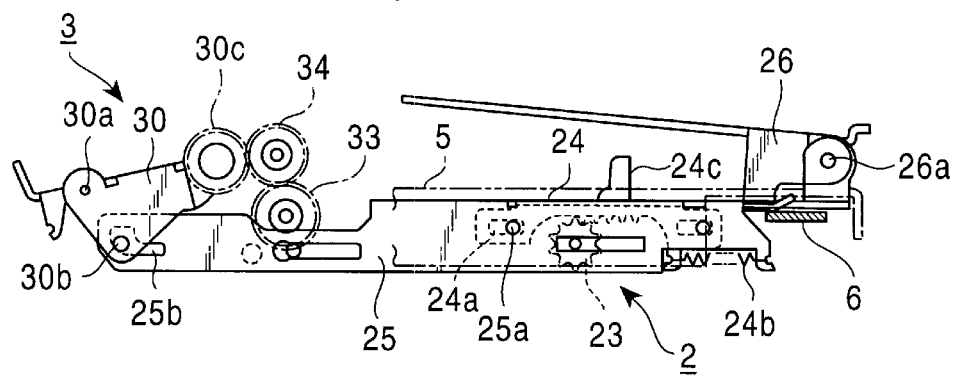
FIG. 2B is a side view each showing a state of the disk player in accordance with the first embodiment in which a rack plate meshes with a pinion from the initial state in FIGS. 1A and 1B to start an operation of a shift plate.

When the shift plate 25 returns to the initial position, as shown in FIG. 2A, the transporting roller member 30 reaches the upper disk abutting position, as shown in FIG. 2B to bring about a disk transportable state. Even after the shift plate 25 has reached the initial position, the rack plate 24 meshed with the pinion 23 retracts by a fixed stroke with respect to the shift plate 25 to return to the initial position where it is separated from the pinion 23, as shown in FIG. 1A.

14) Horizontal Transportation of the Disk

As shown in FIG. 2B, after the transporting roller member 20 has reached the upper disk abutting position, the disk is horizontally transported from the turntable to the disk insertion opening by the rotation of the transporting roller to the ejecting side (in the counterclockwise direction in the drawing), and reaches a position where it can be taken out from the outside. At this point in time, the loading motor 10 is stopped by a loading motor stop command made by the disk detection elements.

[Effects]

As described above, in accordance with this embodiment, both the disk mounting mechanism including the switching control mechanism 2 and the transporting roller-actuating mechanism 3, and the pickup feeding mechanism 4 can be actuated by the selecting mechanism 1 in accordance with the present invention with the driving force of the single loading motor 10. Therefore, one motor can be reliably reduced as compared with the conventional art in which the disk mounting mechanism and the pickup feeding mechanism have been actuated by individual motors. That is, only the use of the disk drive motor 9 and the loading motor 10 can be used to actuate the overall mechanism.

In addition, the use of individual idler gears 15 to 17 for the switching control mechanism 2, the transporting roller-actuating mechanism 3 and the pickup feeding mechanism 4 allows arrangement of these idler gears 15 to 17 at convenient positions for the mechanisms, respectively. Therefore, the versatility of the design can be advantageously improved as compared with a case where a single idler gear is connected to the respective mechanisms. In this regard, the selecting mechanism 1 is simply composed of the worm 11, the worm wheel 12, the idler plate 14, and the three idler gears 15 to 17.

As described above, in accordance with this embodiment, the number of components including the supporting members of the motors and the driving force transmission members can be reduced to simplify the configuration, and the amount of space occupied by the components can be reduced. In addition, the versatility of the arrangement and design of the members around the motors including the selecting mechanism can be increased, and the number of wires for power supply and control related to the motors can be reduced. Therefore, a reduction in size and simplification of the overall mechanism can be achieved, and the cost can be reduced by that of one motor, thereby providing an economical advantage.

On the other hand, during the disk loading and ejecting operations, the idler plate 14 is locked at the disk mounting position by the shift plate 25, whereby the switching control mechanism. 2 and the transporting roller-actuating mechanism 3 can be reliably kept coupled to the loading motor 10. In addition, during the disk playback operation and the optical pickup return operation, the idler plate 14 is locked at the pickup feed position by the idler lock plate 45, whereby the pickup feeding mechanism can be reliably kept coupled to the loading motor 10.

Therefore, the idler plate 14 can be prevented from wrong operation during the operations, so that the disk player has advantageous operative reliability. In this case, the shift plate 25 is used as the disk mounting lock means, so that the number of components can be reduced and the configuration can be simplified, as compared with a case where a special-purpose lock member is provided.

Further, the lock of the idler plate 14 can be reliably released when the shift plate 25 reaches the chucking completion position, so that the actuation can be reliably switched from the switching control mechanism 2 and the transporting roller-actuating mechanism 3 to the pickup feeding mechanism 4. In addition, the idler lock plate 45 can be mechanically reliably moved to the release side by the optical pickup 40 so as to release the lock of the idler plate 14 when the optical pickup 40 returns to the initial state, so that the actuation can be reliably switched from the pickup feeding mechanism 4 to the switching control mechanism 2 and the transporting roller-actuating mechanism 3.

Therefore, the disk loading operation can be reliably shifted to the optical pickup feeding operation, and the return operation of the optical pickup can be reliably shifted to the disk ejecting operation, so that the disk player has advantageous operative reliability also in regard to this point.

Second Embodiment

[Configuration]

Figure 10:
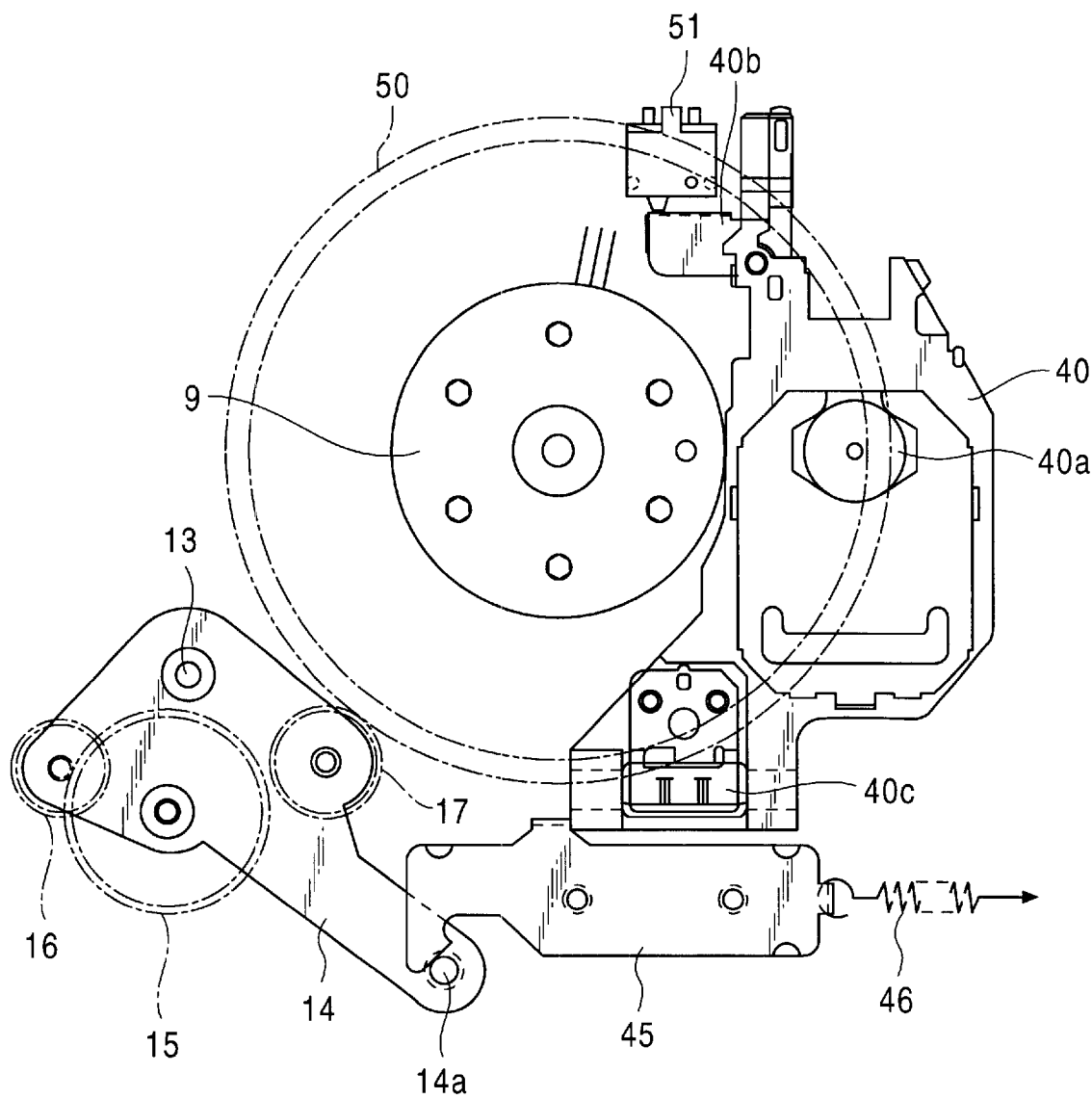
FIG. 10 is a plan view of a disk player in accordance with a second embodiment of the present invention, particularly showing a state of a state detection mechanism utilizing the operation of the optical pickup.

FIG. 10 illustrates a disk player in accordance with the second embodiment of the present invention. In particular, FIG. 10 is a plan view showing the initial state of a state detection mechanism utilizing the operation of the optical pickup. Since the disk player of this embodiment has a configuration similar to that of the disk player of the first embodiment including the state detection mechanism, only the points which are different from the first embodiment will now be described.

Referring to FIG. 10, there is shown a read-in area 50 of the disk arranged on the turntable. A detection switch (detection element) 51 is provided for detecting both the inner periphery of the optical pickup 40 and the completion of chucking in response to the operation of the optical pickup 40 with respect to the read-in area 50. In addition, a presser section 40b for pressing the detection switch 51 is provided on one end of the optical pickup 40.

Figure 11:
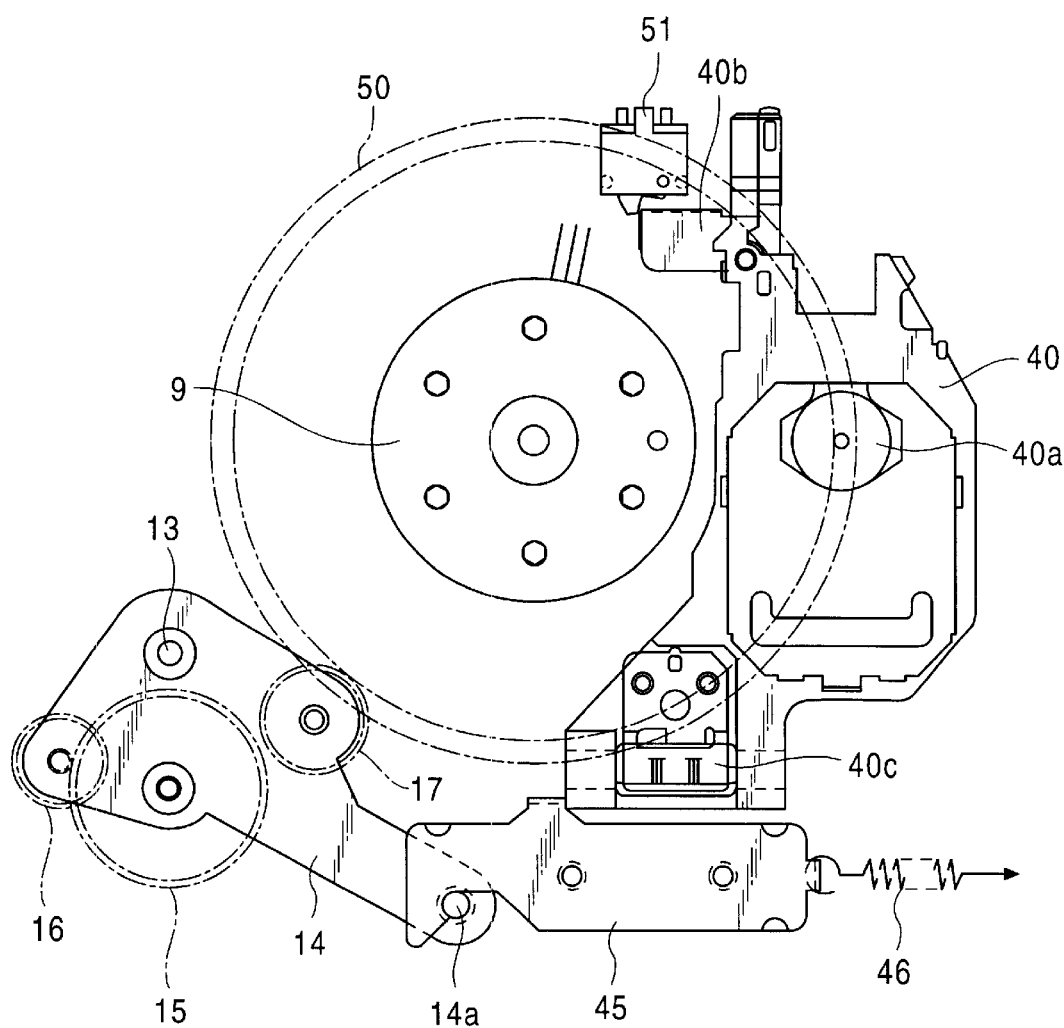
FIG. 11 is a plan view showing a state of the disk player in accordance with the second embodiment in which the optical pickup reaches the inner peripheral position.

The arrangement is such that the detection switch 51 is pressed by the presser section 40b within the range in which the optical pickup 40 moves from the innermost peripheral position shown in FIG. 10 to the inner peripheral position shown in FIG. 11 and that the detection switch 51 is released from the presser section 40b at the point in time when the optical pickup 40 moves to the outside of the inner peripheral position shown in FIG. 11. The detection switch 51 and the presser section 40b are provided on the opposite side of a screw holder 40c for holding the lead screw 43.

[Operation]

In the disk player of this embodiment having the configuration as described above, both the completion of chucking and the inner periphery of the optical pickup can be detected by the single detection switch 51. These detecting operations will now be described.

First, as shown in FIG. 10, in the initial state, a center of a pickup lens 40a of the optical pickup 40 is located at the innermost peripheral position, and the presser section 40b presses the detection switch 51. In addition, at this time, the idler plate 14 is locked at the disk mounting position by the lock slot 25d of the shift plate 25 shown in FIGS. 1 to 9, whereas the idler lock plate 45 is held at the release position by being engaged with the optical pickup 40, and does not lock the idler plate 14.

During a period in which the disk is inserted from the initial position, the disk loading operation is performed by the idler gears 15 and 16 provided on the idler plate 14, and the disk is chucked on the turntable, the optical pickup 40 is held at the innermost peripheral position.

Thereafter, when the chucking of the disk on the turntable is completed and the idler plate 14 pivots in the counterclockwise direction to reach the pickup feed position shown in FIG. 11, the movement of the optical pickup 40 to the outside (rightward in the drawing) is started by the idler gear 17. At the time when the center of the pickup lens 40a moves to the inner peripheral position overlapping the read-in area of the disk, the idler lock plate 45 is, released from the optical pickup 40 to be engaged with the pin 14a of the idler plate 14 by a biasing force of a spring 46, and locks the idler plate 14 at the pickup feed position.

Figure 12:
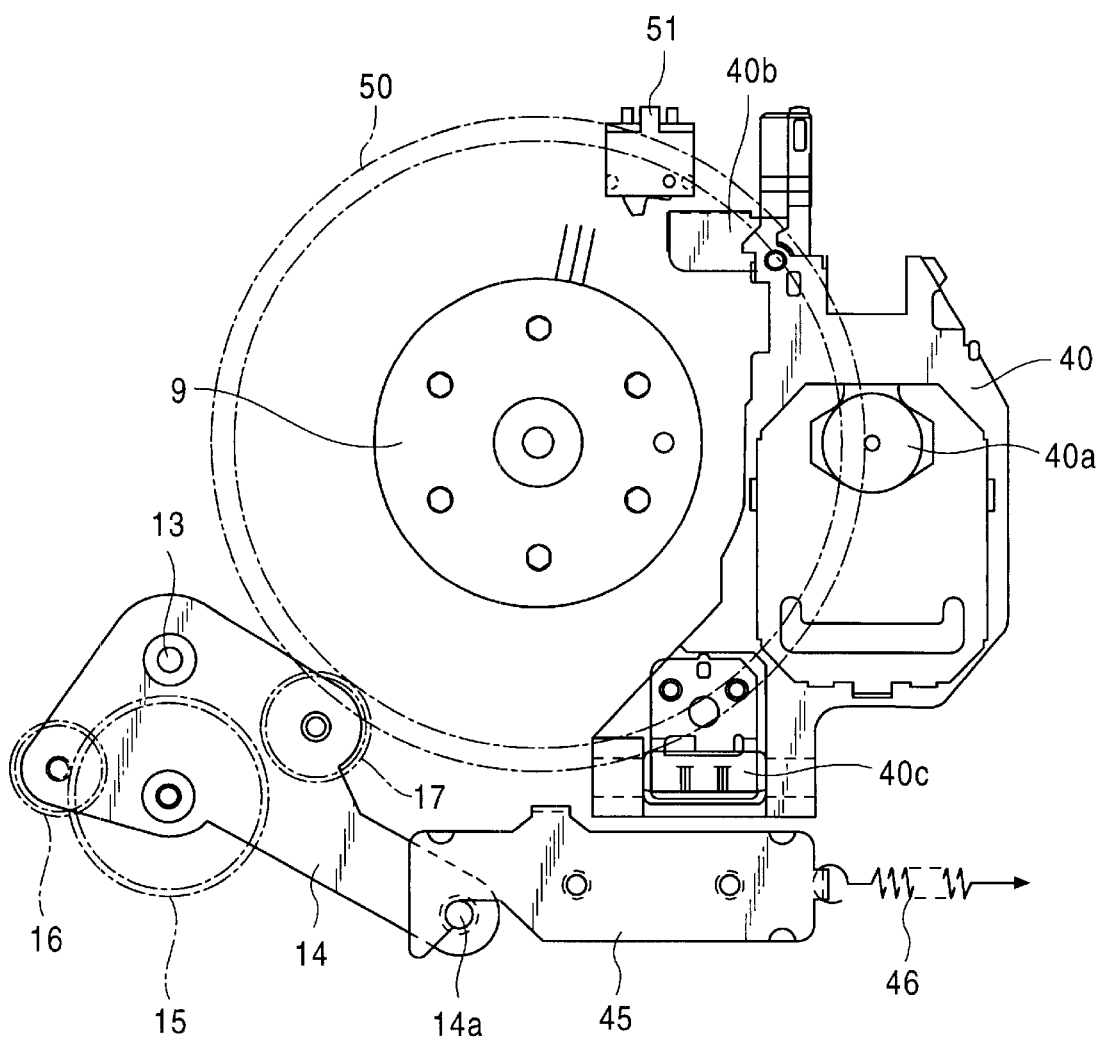
FIG. 12 is a plan view showing a state of the disk player in accordance with the second embodiment in which the optical pickup reaches the outer position of the inner peripheral position.

Although the optical pickup 40 presses the detection switch 51 by means of the presser section 40b, as shown in FIG. 11 on the inner peripheral position, the optical pickup 40 is separated from the detection switch 51 at the time when it moves further outside. That is, as shown in FIG. 12, at the point in time when the center of the pickup lens 40a moves further outside from the read-in area of the disk, the presser section 40b is separated from the detection switch 51 to release the detection switch 51. The completion of chucking is detected by signals emitted from the detection switch 51 by this operation.

Then, in response to the detection of the completion of chucking, the operating direction of the optical pickup 40 is reversed to move the optical pickup 40 from the outer position of the inner peripheral position shown in FIG. 12 to the inner peripheral position shown in FIG. 11. As a result, the detection switch 51 once released is pressed again by the presser section 40b of the optical pickup 40. The inner periphery of the optical pickup 40 is detected by signals emitted from the detection switch 51 by this operation.

Further, in response to the detection of the inner periphery of the optical pickup 40, the disk drive motor 9 is started to rotate the disk, thereby reading the TOC signals recorded in the read-in area by the optical pickup 40. At this point in time, the idler plate 14 is locked at the pickup feed position by the idler lock plate 45, so that a driving force transmission system of the optical pickup 40 is maintained. After reading the TOC signals, the disk playback operation is performed by the rotation of the disk and the movement of the optical pickup 40.

On the other hand, during the disk ejecting operation, the detection switch 51 that has been in a release state is pressed by the presser section 40b at the time when the optical pickup 40 reaches the inner peripheral position, whereby the inner periphery of the optical pickup 40 is detected. The optical pickup 40 moves inward by a predetermined distance from the inner peripheral position, and stops when it reaches the innermost peripheral position shown in FIG. 10.

[Effects]

As described above, in accordance with this embodiment, both the completion of chucking and the inner periphery of the optical pickup can be detected by the single detection switch 51 with the operation of the optical pickup 40. This allows the number of detection elements to be reduced, as compared with the conventional art in which individual detection elements are provided for detecting the inner periphery of the optical pickup and the completion of chucking, respectively, so that the number of wires for the detection elements can be reduced and the peripheral members can easily be arranged and designed. Therefore, the configuration of the overall mechanism can be simplified. In addition, in this embodiment, the detection switch 51 is provided around the optical pickup 40, particularly in an area having a relatively wide open space that is opposite to the lead screw 43. Thus, the disk player offers the advantages of increased versatility of the arrangement of the detection switch 51 and of having little effect on the arrangement and design of other members.

Third Embodiment

Figure 13:
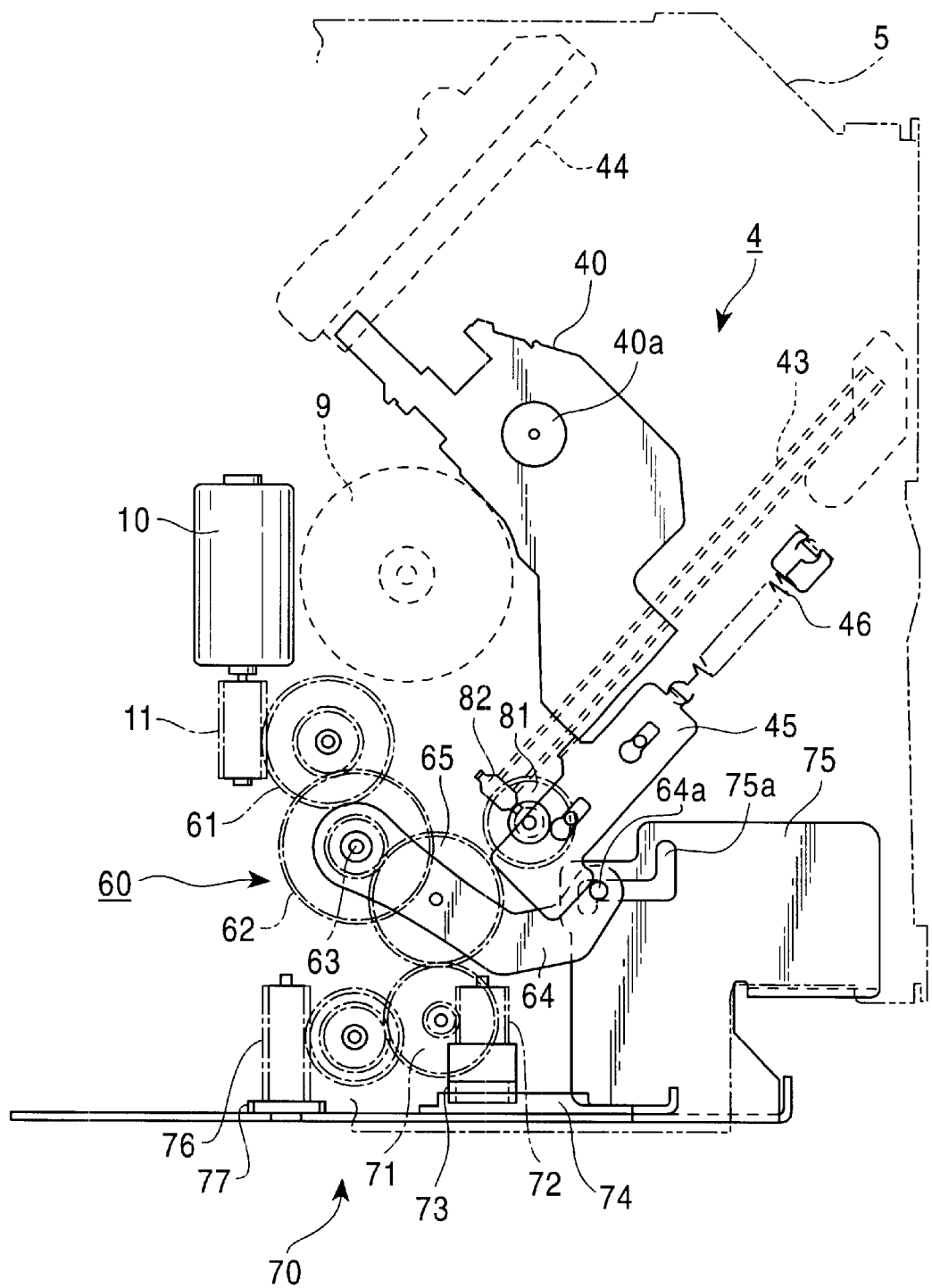
FIG. 13 illustrates a disk player in accordance with a third embodiment of the present invention.

FIG. 13 illustrates a disk player in accordance with a third embodiment of the present invention in which the configuration of the driving force transmission system in the first embodiment is changed. For simplicity of the drawing, FIG. 13 shows only main members on the driving side.

As shown in FIG. 13, in the disk player of this embodiment, a selecting mechanism 60 is configured to transmit the driving force of the loading motor 10 selectively to a disk mounting mechanism 70 and the pickup feeding mechanism 4. That is, in this embodiment, the driving force transmission systems separated for the switching control mechanisms 2 and the transporting roller-actuating mechanism 3 in the first embodiment are integrated into a single driving force transmission system, i.e., the disk mounting mechanism 70, and the configuration of the selecting mechanism 60 is changed. Detailed configurations of the selecting mechanism 60 and the disk mounting mechanism 70 will now be described.

First, in the selecting mechanism 60, an idler plate 64 is provided in a position overlapping not a worm wheel that always meshes with the worm wheel provided on the shaft of the loading motor 10 but a driving gear 62 that always meshes with the worm wheel 61 so as to pivot around a shaft 63 of the driving gear 62. The idler plate 64 is formed into substantially an inverted J-shape, is mounted to the shaft 63 at its straight-line side end, and has a single idler gear 65 mounted to the center thereof. The idler plate 64 is adapted to be rotated between a disk mounting position to couple the idler gear 65 to the disk mounting mechanism 70 and a pickup feed position to couple the idler gear 65 to the pickup feeding mechanism 4. A position controlling pin 64a is mounted to a curved section side end of the idler plate 64.

In addition, in the disk mounting mechanism 70, a disk mounting gear 71 capable of meshing with the idler gear 65 is provided. A rotational driving force of the disk mounting gear 71 is transmitted to a rack plate 74 and a shift plate 75 via a first driving force conversion mechanism 72 and a pinion 73 so as to linearly actuate these plates 74 and 75.

FIG. 13 only shows a state where the idler plate 64 is inserted into a lock slot 75a formed in the shift plate 75, and does not show an engagement with another member. Actually, however, cam slots that are similar to those of the first embodiment are formed so as to perform switching of the transporting roller member and the damper member in response to the position of the shift plate 75. On the other hand, the rotational driving force of the disk mounting gear 71 is also transmitted to a gear 77 via a second driving force conversion mechanism 76, and the gear 77 is adapted to provide a rotational driving force of a transporting roller (not shown).

Further, in the pickup feeding mechanism 4, a pickup feeding gear 81 is composed of integrated large and small gears each having the diameter larger than that of the pickup feeding gear 41 in the first embodiment. A horizontal rotational driving force of the pickup feeding gear 81 is converted into an orthogonal rotational driving force via a driving force conversion mechanism 82 consisting of intersecting gears so as to be transmitted to the lead screw 43.

[Operation and Effects]

In this embodiment, similarly to the first embodiment, the disk mounting mechanism 70 and the pickup feeding mechanism 4 can be actuated by the driving force of the single loading motor 10.

That is, during the disk loading and ejecting operations, the idler plate 64 is locked at the disk mounting position by the shift plate 75, whereby the disk mounting mechanism 70 can be reliably actuated by the driving force of the loading motor 10. During the disk playback operation and the return operation of the optical pickup, the idler plate 64 is locked at the pickup feed position by the idler lock plate 45, whereby the pickup feeding mechanism 4 can be reliably actuated by the driving force of the loading motor 10.

In accordance with this embodiment, similarly to the first embodiment, one motor can be reliably reduced as compared with the conventional art in which the disk mounting mechanism and the pickup feeding mechanism have been actuated by individual motors, so that the number of components including supporting members and driving force-transmitting members can be reduced, the amount of space occupied by the components can be reduced, the versatility of the design can be increased, and the number of wires related to the motors can be reduced. Therefore, a reduction in size and simplification of the overall mechanism can be achieved, and the cost can be reduced by that of one motor, thereby providing an economical advantage.

In addition, similar to the first embodiment, the idler plate 64 is locked at a predetermined position during each of the operations, whereby the idler plate 64 can be prevented from wrong operation during the operations, so that the disk player has advantageous operative reliability. In this case, the shift plate 25 is used as the disk mounting lock means, so that the number of components can be reduced and the configuration can be simplified, as compared with a case where a special-purpose lock member is provided. Further, the disk loading operation can be reliably shifted to the optical pickup feeding operation, and return operation of the optical pickup can be reliably shifted to the disk ejecting operation, so that the disk player has advantageous operative reliability also in regard to this point.

Fourth Embodiment

[Configuration]

Figure 14:
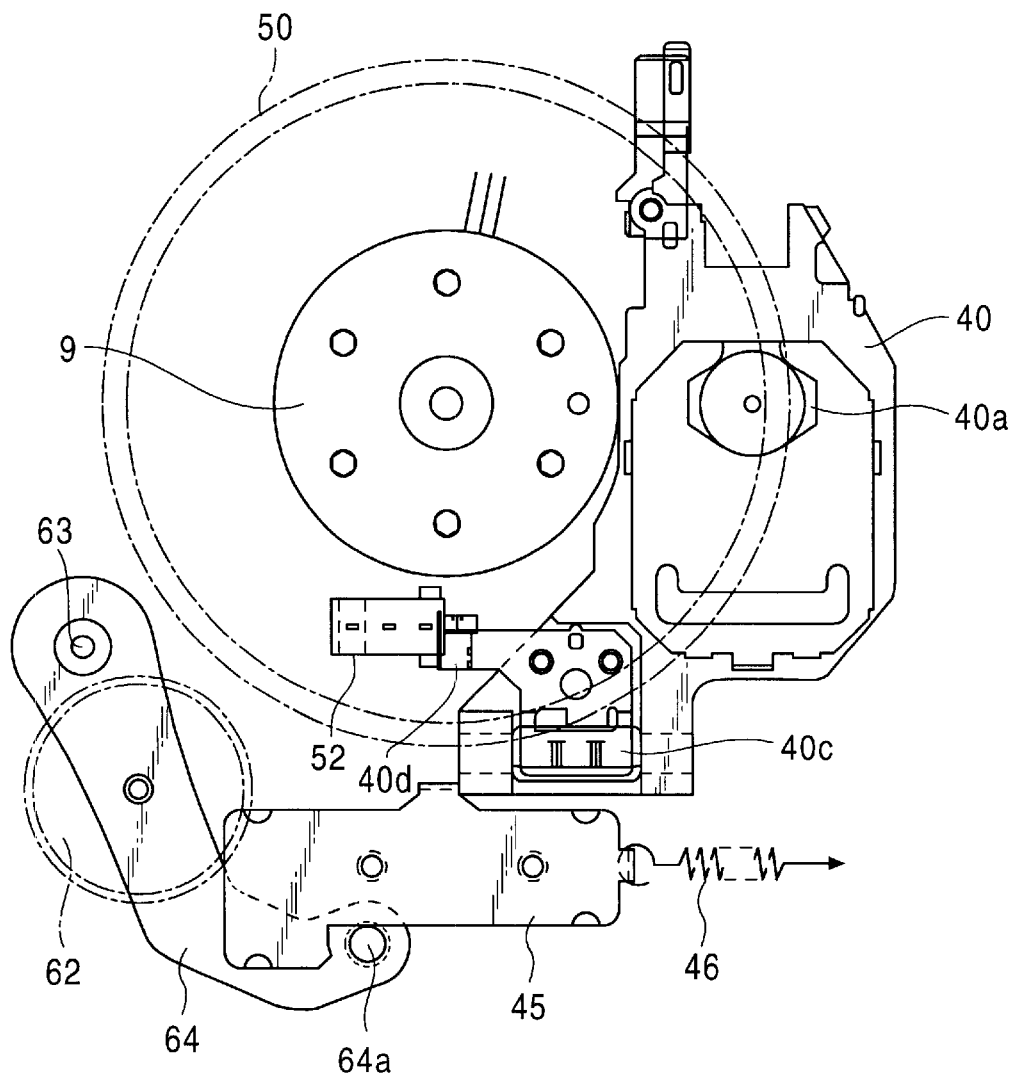
FIG. 14 illustrates a disk player in accordance with a fourth embodiment of the present invention.

FIG. 14 illustrates a disk player in accordance with a fourth embodiment of the present invention. In particular, FIG. 14 is a plan view showing the initial state of a state detection mechanism utilizing the operation of the optical pickup. Since the disk player in this embodiment has a basic configuration similar to that of the disk player of the third embodiment, and a basic principle of operation of the state detection mechanism is similar to that of the state detection mechanism of the second embodiment, only the points which are different from the first embodiment will now be described.

In this embodiment, in contrast with the second embodiment, a detection switch 52 is provided on the side of the screw holder 40c of the optical pickup 40, as shown in FIG. 14, and the detection switch 52 is adapted to be pressed by a spring section 40d that is projectingly provided on a part of the screw holder 40c.

Similarly to the second embodiment, the arrangement is such that the detection switch 52 is pressed by the spring section 40d within the range in which the optical pickup 40 moves from the innermost peripheral position to the inner peripheral position shown in FIG. 14, and that the detection switch 52 is released from the spring section 40d at the point in time when the optical pickup 40 moves to the outside from the inner peripheral position.

[Operation and Effects]

In this embodiment, similarly to the second embodiment, the detection switch 52 is pressed by the spring section 40d of the optical pickup 40 when the optical pickup 40 is located at the innermost peripheral position. At the point when the optical pickup 40 moves from the innermost peripheral position to the outer position of the inner peripheral position via the inner peripheral position, the detection switch 52 is released and the completion of chucking is detected. When the optical pickup 40 is reversed to move to the inner peripheral position in response to the detection of the completion of chucking, the detection switch 52 once released is pressed again by the spring section 40d, so that the inner periphery of the optical pickup is detected.

In accordance with this embodiment, similarly to the second embodiment, both the completion of chucking and the inner periphery of the optical pickup can be detected by the single detection switch 52. Therefore, the number of detection elements can be reduced as compared with the conventional art in which individual detection elements are provided, the number of wires for the detection elements can be reduced, and the peripheral members can easily be arranged and designed, so that the configuration of the overall mechanism can be simplified.

Modifications

The present invention is not limited to the embodiments described above, and various modifications may be made within the scope of the present invention.

For example, the specific configuration of the selecting mechanism including the number and the arrangement of the idler gears, and the configuration of the driving force transmission system for the selecting mechanism, the disk mounting mechanism and the pickup feeding mechanism may suitably be selected. In addition, the specific configuration of the lock means for locking the idler plate, and the specific configuration of the state detection mechanism including the detection elements may suitably be selected. Further, the specific configurations of the disk mounting mechanism and the pickup feeding mechanism may suitably be selected.

Still further, the present invention is applicable to various types of disk players adapted for one or several types of optical disks selected from optical disks including the CD, MD, LD, and DVD, and in any case, advantageous effects as described above are achieved.

As described above, in accordance with the present invention, the disk mounting mechanism and the pickup feeding mechanism are selectively actuated by the single driving source, thereby reducing the number of driving sources. In addition, both the completion of chucking and the inner periphery of the optical pickup can be detected by the single detection element, thereby reducing the number of detection elements. Therefore, a disk player which can achieve an increase in the versatility of the arrangement and design of the members, a reduction in size and simplification of the overall mechanism, and a reduction in cost by reducing the number of motors, detection elements, and associated members including wires can be provided.

What is claimed is:

1. A disk player, comprising:
   a disk rotating mechanism for rotationally driving a turntable, thereby rotating a disk carried by the turntable;
   a disk mounting mechanism for mounting the disk onto the turntable of a disk drive section;
   a disk mounting lock unit;
   a pickup feeding mechanism for moving an optical pickup reading optical signals in a radial direction of the disk;
   a pickup feeding lock unit;
   a single driving source; and
   a selecting mechanism for transmitting a driving force from the single driving source selectively to the disk mounting mechanism and the pickup feeding mechanism whereby the selecting mechanism is locked at a disk mounting position by the disk mounting lock unit during disk loading and ejection and is locked at a pickup feed position by the pickup feeding lock unit, wherein the selecting mechanism includes an idler plate that is pivotably mounted to contact the pickup feeding lock unit and a first idler gear that is operatively positioned to transmit a driving force to the disk mounting mechanism when locked by the disk mounting lock unit.

2. The disk player according to claim 1 further including a switch plate that is operatively connected to the idler plate and the disk mounting lock unit.

3. The disk player according to claim 1 wherein the idler plate supports a second idler gear that is operatively positioned to transmit the driving force to the pickup feeding mechanism when locked by the pickup feeding lock unit.

4. A disk player, comprising:
   a disk rotating mechanism for rotationally driving a turntable, thereby rotating a disk carried by the turntable;
   a disk mounting mechanism for mounting the disk onto the turntable of a disk drive section; and
   a pickup feeding mechanism for moving an optical pickup for reading optical signals in a radial direction of the disk,
   wherein said disk player includes a selecting mechanism for transmitting a driving force from a single driving source selectively to said disk mounting mechanism and said pickup feeding mechanism including a selecting member which moves between a disk mounting position to transmit the driving force to said disk mounting mechanism and a pickup feed position to transmit the driving force to said pickup feeding mechanism,
   wherein said disk mounting mechanism has a disk mounting lock unit which locks said selecting member at said disk mounting position during a disk mounting operation, and
   wherein said pickup feeding mechanism has a pickup feeding lock unit which locks said selecting member at said pickup feed position during a pickup feeding operation, wherein said optical pickup is located at an innermost peripheral position on an inner periphery side of an information recording area of the disk where optical disk signals are readable during the operation of said disk mounting mechanism, holds said pickup feeding lock unit on a lock release side when located at said innermost peripheral position, and releases said pickup feeding lock unit so as to lock said selecting member at the pickup feed position when located on said inner peripheral position.

5. A disk player, comprising:
   a disk rotating mechanism for rotationally driving a turntable, thereby rotating a disk carried by the turntable;
   a disk mounting mechanism for mounting the disk onto the turntable of a disk drive section;
   a pickup feeding mechanism for moving an optical pickup for reading optical signals in a radial direction of the disk; and
   a selecting mechanism for transmitting a driving force from a single driving source selectively to the disk mounting mechanism and the pickup feeding mechanism including a driving gear which is always coupled to the single driving source to be rotated by the driving force from the driving source;
   an idler plate which is pivotable between the disk mounting position and the pickup feed position by a friction generated between the idler plate and the driving gear in response to the direction of rotation of the driving gear; and
   an idler gear which is provided on one end of the idler plate so as to be always coupled to the driving gear, rotated with respect to the driving gear in response to the pivoting of the idler plate, coupled to the disk mounting mechanism when the idler plate is located on the disk mounting position, and coupled to the pickup feeding mechanism when the idler plate is located on the pickup feed position, wherein said idler gear includes:
   a disk mounting idler gear which is coupled to the disk mounting mechanism when the idler plate is located on the disk mounting position; and
   a pickup feeding idler gear which is separately provided from the disk mounting idler gear so as to be coupled to the pickup feeding gear when the idler plate is located on the pickup feed position.

6. A disk player, comprising:
   a disk rotating mechanism for rotationally driving a turntable, thereby rotating a disk carried by the turntable;
   a disk mounting mechanism for mounting the disk onto the turntable of a disk drive section;
   a pickup feeding mechanism for moving an optical pickup for reading optical signals in a radial direction of the disk; and a selecting mechanism for transmitting a driving force from a single driving source selectively to the disk mounting mechanism and the pickup feeding mechanism including a driving gear which is always coupled to the single driving source to be rotated by the driving force from the driving source;

an idler plate which is pivotable between the disk mounting position and the pickup feed position by a friction generated between the idler plate and the driving gear in response to the direction of rotation of the driving gear; and an idler gear which is provided on one end of the idler plate so as to be always coupled to the driving gear, rotated with respect to the driving gear in response to the pivoting of the idler plate, coupled to the disk mounting mechanism when the idler plate is located on the disk mounting position, and coupled to the pickup feeding mechanism when the idler plate is located on the pickup feed position, wherein the disk mounting mechanism includes a switching control mechanism for switching a clamper member which chucks the disk on the turntable between a chucking side and a release side, and switching a transporting roller for horizontally transporting the disk onto the turntable between a disk abutting side and a release side, and a transforming roller-actuating mechanism for rotationally actuating the transporting roller, and wherein the idler gear includes:

a switching idler gear which is coupled to the switching control mechanism when the idler plate is located on the disk mounting position;

a transporting roller-actuating idler gear which is provided separately from the switching idler gear so as to be coupled to the transporting roller-actuating mechanism when the idler plate is located on the disk mounting position; and a pickup feeding idler gear which is provided separately from the switching idler gear and the transporting roller-actuating idler gear so as to be coupled to the pickup feeding gear when the idler gear is located on the pickup feeding position.

7. A disk player, comprising:

a disk rotating mechanism for rotationally driving a turntable, thereby rotating a disk carried by the turntable;

a disk mounting mechanism for mounting the disk onto the turntable of the disk drive section including a switching member for switching the mounting of the disk on the turntable and a disk mounting lock unit connected to the switching member;

a pickup feeding mechanism for moving an optical pickup for reading optical signals in a radial direction of the disk including a pickup feeding lock unit; and a selecting mechanism for transmitting a driving force from a driving source selectively to the disk mounting mechanism and the pickup feeding mechanism wherein the selecting mechanism has a selecting member which moves between a disk mounting position to transmit the driving force to the disk mounting mechanism and a pickup feed position to transmit the driving force to the pickup feeding mechanism, the disk mounting lock unit locks the selecting member at the disk mounting position during a disk mounting operation, and the pickup feeding lock unit locks the selecting member at a pickup feed position during a pickup feeding operation, wherein the disk mounting lock unit releases the lock of the selecting member when the operating member reaches an operating completion position.

8. A disk player, comprising:

a disk rotating mechanism for rotationally driving a turntable, thereby rotating a disk carried by the turntable;

a disk mounting mechanism for mounting the disk onto the turntable of a disk drive section; and a pickup feeding mechanism for moving an optical pickup for reading optical signals in a radial direction of the disk, wherein said disk player includes a selecting mechanism for transmitting a driving force from a single driving source selectively to said disk mounting mechanism and said pickup feeding mechanism including a selecting member which moves between a disk mounting position to transmit the driving force to said disk mounting mechanism and a pickup feed position to transmit the driving force to said pickup feeding mechanism, wherein said disk mounting mechanism has a disk mounting lock unit which locks said selecting member at said disk mounting position during a disk mounting operation, and wherein said pickup feeding mechanism has a pickup feeding lock unit which locks said selecting member at said pickup feed position during a pickup feeding operation, the disk mounting lock unit is provided on a part of a disk mounting mechanism including a switching member for switching a chucking of the disk on the turntable, and is adapted to release the lock of the selecting member when the switching member reaches a chucking completion position which provides an operating completion position.

9. A disk player according to claim 8, wherein said optical pickup is adapted to locate at the innermost peripheral position that is further inside of an inner peripheral position on the inner periphery side of an information recording area of a disk where optical disk signals are readable during the operation of said disk mounting mechanism, is adapted to hold said pickup feeding lock unit on a lock release side when located at said innermost peripheral position, and is adapted to release said pickup feeding lock unit so as to lock said selecting member at the pickup feed position by said pickup feeding lock unit when located on said inner peripheral position and on the outside of said inner peripheral position.

10. A disk player, comprising:

a disk rotating mechanism for rotationally driving a turntable, thereby rotating a disk carried by the turntable;

a disk mounting mechanism for mounting the disk onto the turntable of a disk drive section; and a pickup feeding mechanism for moving an optical pickup for reading optical signals in a radial direction of the disk, wherein said disk player includes a selecting mechanism for transmitting a driving force from a single driving source selectively to said disk mounting mechanism and said pickup feeding mechanism includes a selecting member which moves between a disk mounting position to transmit the driving force to said disk mounting mechanism and a pickup feed position to transmit the driving force to said pickup feeding mechanism, wherein said disk mounting mechanism has a disk mounting lock unit which locks said selecting member at said disk mounting position during a disk mounting operation, and wherein said pickup feeding mechanism has a pickup feeding lock unit which locks said selecting member at said pickup feed position during a pickup feeding operation, wherein said selecting member includes:

a driving gear which is always coupled to said single driving source to be rotated by the driving force from said driving source;

an idler plate which is provided as said selecting member to be pivoted between said disk mounting position and said pickup feed position by a friction generated between said idler plate and said driving gear in response to the direction of rotation of said driving gear; and an idler gear which is provided on one end of said idler plate so as to be always coupled to said driving gear, rotated with respect to said driving gear in response to the pivot of said idler plate, coupled to said disk mounting mechanism when said idler plate is located on said disk mounting position, and coupled to said pickup feeding mechanism when said idler plate is located on said pickup feed position, wherein said idler gear includes:

a disk mounting idler gear which is coupled to said disk mounting mechanism when said idler plate is located on said disk mounting position; and a pickup feeding idler gear which is separately provided from said disk mounting idler gear so as to be coupled to said pickup feeding gear when said idler plate is located on said pickup feed position.

11. A disk player, comprising:

a disk rotating mechanism for rotationally driving a turntable, thereby rotating a disk carried by the turntable;

a disk mounting mechanism for mounting the disk onto the turntable of a disk drive section; and a pickup feeding mechanism for moving an optical pickup for reading optical signals in a radial direction of the disk, wherein said disk player includes a selecting mechanism for transmitting a driving force from a single driving source selectively to said disk mounting mechanism and said pickup feeding mechanism including a selecting member which moves between a disk mounting position to transmit the driving force to said disk mounting mechanism and a pickup feed position to transmit the driving force to said pickup feeding mechanism, wherein said disk mounting mechanism has a disk mounting lock unit which locks said selecting member at said disk mounting position during a disk mounting operation, and wherein said picking feeding mechanism has a pickup feeding lock unit which locks said selecting member at said pickup feed position during a pickup feeding operation, wherein said selecting mechanism includes:

a driving gear which is always coupled to said single driving source to be rotated by the driving force from said driving source;

an idler plate which is provided as said selecting member to be pivoted between said disk mounting position and said pickup feed position by a friction generated between said idler plate and said driving gear in response to the direction of rotation of said driving gear; and an idler gear which is provided on one end of said idler plate so as to be always coupled to said driving gear, rotated with respect to said driving gear in response to the pivot of said idler plate, coupled to said disk mounting mechanism when said idler plate is located on said disk mounting position, and coupled to said pickup feeding mechanism when said idler plate is located on said pickup feed position, and wherein said disk mounting mechanism includes a switching control mechanism for switching a damper member which chucks the disk on said turntable between a chucking side and a release side, and switching a transporting roller for horizontally transporting the disk onto said turntable between a disk abutting side and a release side, and a transforming roller-actuating mechanism for rotationally actuating said transporting roller, and wherein said idler gear includes:

a switching idler gear which is coupled to said switching control mechanism when said idler plate is located on said disk mounting position;

a transporting roller-actuating idler gear which is provided separately from said switching idler gear so as to be coupled to said transporting roller-actuating mechanism when said idler plate is located on said disk mounting position; and a pickup feeding idler gear which is provided separately from said switching idler gear and said transporting roller-actuating idler gear so as to be coupled to said pickup feeding gear when said idler gear is located on said pickup feeding position.

* * * * *